US012771167B2

(12) United States Patent
Bilgin et al.

(10) Patent No.: US 12,771,167 B2
(45) Date of Patent: Oct. 20, 2026

(54) SYSTEM AND METHOD FOR HYBRID POWER GENERATION WITH GRID CONNECTION

(71) Applicant: CleanDesign Power Systems Inc., Burlington (CA)

(72) Inventors: Memet Bilgin, Mahone Bay (CA); Joel Donen, Burlington (CA); Robert Adsett, Kitchener (CA); Vince Scaini, Hamilton (CA); Kevin McIntyre, Beamsville (CA)

(73) Assignee: CLEANDESIGN POWER SYSTEMS INC, Toronto (CA)

( * ) Notice: Subject to any disclaimer, the term of this patent is extended or adjusted under 35 U.S.C. 154(b) by 736 days.

(21) Appl. No.: 18/106,734

(22) Filed: Feb. 7, 2023

(65) Prior Publication Data

US 2023/0253822 A1 Aug. 10, 2023

Related U.S. Application Data

(60) Provisional application No. 63/307,976, filed on Feb. 8, 2022.

(51) Int. Cl.
*H02J 13/12* (2026.01)
*H02H 7/26* (2006.01)

(52) U.S. Cl.
CPC ............. *H02J 13/12* (2026.01); *H02H 7/268* (2013.01)

(58) Field of Classification Search
CPC ....................................................... H02J 3/322
See application file for complete search history.

(56) References Cited

U.S. PATENT DOCUMENTS

| | | | | |
|---|---|---|---|---|
| 2004/0264082 | A1* | 12/2004 | Suliman | F03D 9/255 361/62 |
| 2005/0286279 | A1* | 12/2005 | Datta | H02M 7/219 363/89 |
| 2010/0292852 | A1* | 11/2010 | Gertmar | H02J 3/40 290/44 |
| 2014/0058576 | A1* | 2/2014 | Jackson | H02J 3/388 700/297 |
| 2015/0097437 | A1* | 4/2015 | Votoupal | H02J 3/48 307/84 |
| 2016/0248263 | A1* | 8/2016 | Hunt | H02J 7/00714 |
| 2016/0329713 | A1* | 11/2016 | Berard | H02J 3/32 |
| 2017/0288413 | A1 | 10/2017 | Varadarajan et al. | |
| 2017/0317501 | A1* | 11/2017 | Moriyama | H02J 3/381 |
| 2018/0034280 | A1 | 2/2018 | Pedersen | |
| 2018/0076661 | A1* | 3/2018 | Herbener | H02J 9/066 |
| 2018/0109110 | A1* | 4/2018 | Gerdes | H02K 7/1815 |

(Continued)

OTHER PUBLICATIONS

International Search Report and Written Opinion dated Apr. 18, 2023, for International Application No. PCT/CA2023/050158, 11 pages.

*Primary Examiner* — Tynese V Mcdaniel
(74) *Attorney, Agent, or Firm* — Perry + Currier Inc.

(57) ABSTRACT

Embodiments described include hybrid power connections between a drilling rig and a power grid. A hybrid energy controller can provide the ability to connect a high horsepower micro-grid with a drilling rig to a normal utility grid and mitigate any power surges. The micro-grid can comprise battery units capable of providing power when generator sets (gensets) don't meet load demands and storing excess power when supplied power exceeds demand.

11 Claims, 30 Drawing Sheets

(56) References Cited

U.S. PATENT DOCUMENTS

| | | | | |
|---|---|---|---|---|
| 2018/0198282 | A1* | 7/2018 | Hunt | H02J 7/1423 |
| 2018/0269689 | A1* | 9/2018 | Rodriguez | H02J 3/381 |
| 2020/0169200 | A1* | 5/2020 | Oguguo | F02D 29/06 |
| 2020/0301383 | A1* | 9/2020 | Reddy | H02J 3/381 |
| 2021/0320499 | A1* | 10/2021 | Novak | H02J 3/00 |
| 2021/0344201 | A1* | 11/2021 | Li | H02J 7/0031 |
| 2023/0223763 | A1* | 7/2023 | Scheuerell | H02J 3/381<br>307/53 |
| 2024/0088668 | A1* | 3/2024 | Chatterjee | H02J 3/007 |

* cited by examiner

Problem: Multiple Gensets Run To Avoid Blackouts & Power Limits
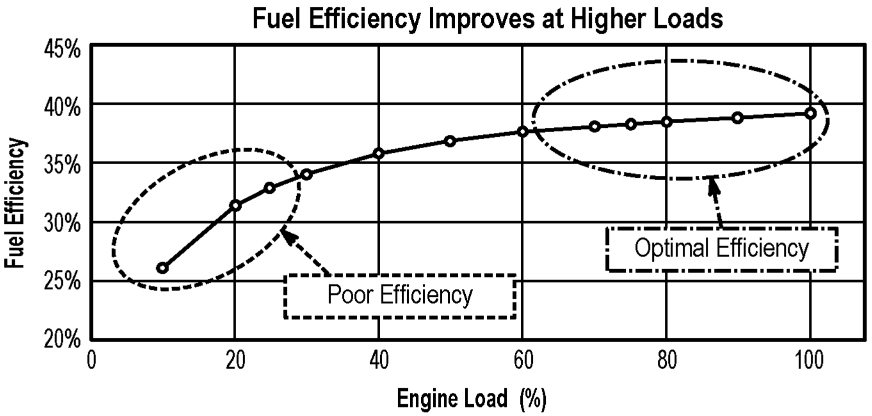
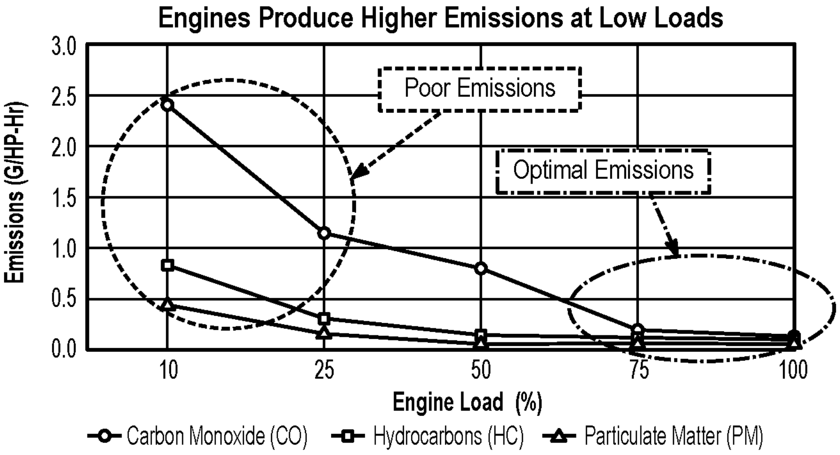
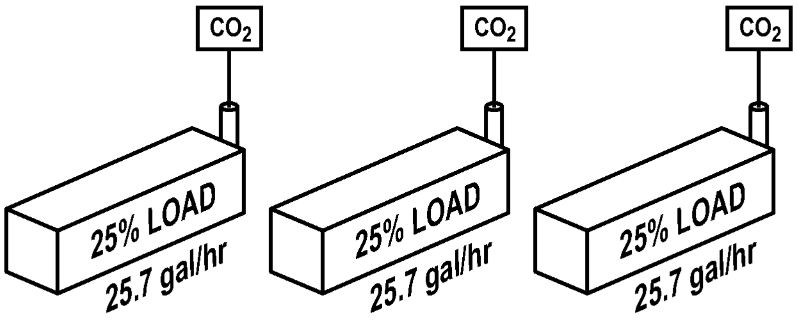
| Scenario | Fuel Used | CO2 Generated | |
|---|---|---|---|
| 3 x 25% LOAD | 77.2 gal/hr | 0.78 tonnes of CO2/hr | Field conditions |
FIG. 2

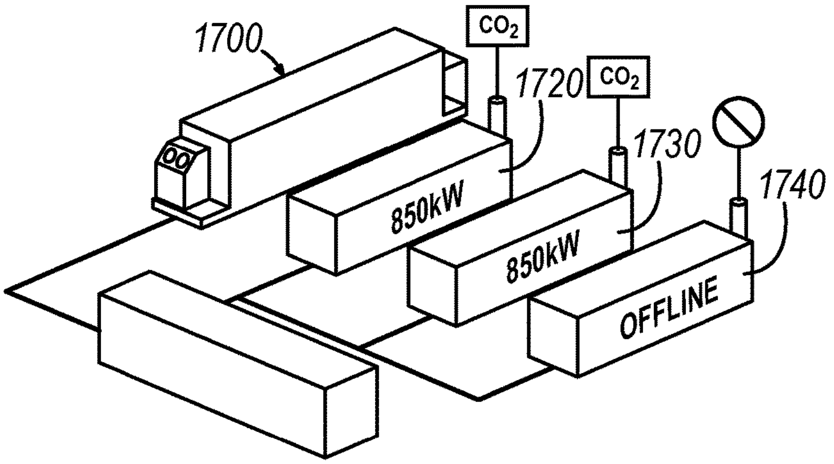
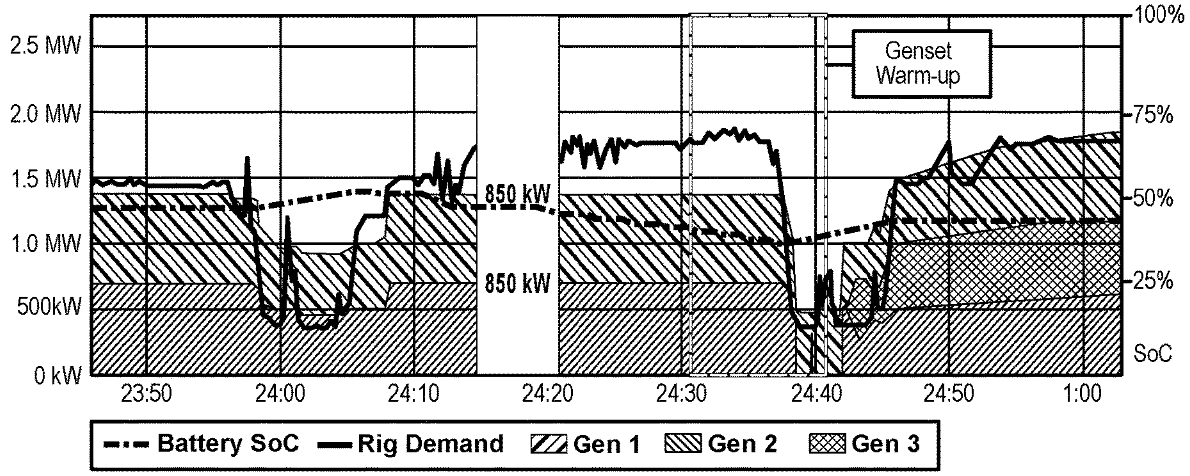
FIG. 17

| Equipment Specifications | 1.5 MVA DC Connected | 1.1 MVA DC Connected | 750 kVA DC Connected |
|---|---|---|---|
| Output Voltage (Normal) | 810-850 VDC | 810-850 VDC | 810-850 VDC |
| DC-DC Converter Output | 4@375kW | 3@375kW | 2@375kW |
| | | | |
| Energy Storage Capacity | 497 kWh | 373 kWh | 249 kWh |
| PEak Battery Power (6C) | 3 MW | 2.2 MW | 1.5 MW |
| MAX Continuous Charge/Discharge Rate (3C/3C) | 1.5 MW | 1.1 MW | 750 kW |
| | | | |
| Standard HVAC (Ambient Temp.) | -20°C to 40°C | -20°C to 40°C | -20°C to 40°C |
| Ruggedized HVAC (Ambient Temp.) | -45°C to 55°C | -45°C to 55°C | -45°C to 55°C |

| Monitoring & Safety Specifications | |
|---|---|
| Genset Operational Data | Plug-and-Play Ready |
| Monitoring, Alerts & Protection | |
| Localized Daata | Driller's Cabin & Other HMIs |
| Online Data Room | Yes - 24/7 Cloud Access |
| Data Auditing | Monthly Report & Logged Data |
| Marine Grade Batteries | DNVGL-CG-0339 Cerificate Available or Equivalent |
| Thermal Runway Protection | Passive: Cell-level; DNV-GL PL6 Ch. 2, NMA 2016 Circular |
| Short Circuit Protection | Battery Side & Output Side |
| Emergency Stop Circuit | Hard-Wired |
| Disconnect Switchgear Rating | Full Load |
| Shock & Vibration Dampening | MIL-STD'810G Category 4 |

FIG. 20

SYSTEM AND METHOD FOR HYBRID POWER GENERATION WITH GRID CONNECTION

CROSS REFERENCE TO RELATED INFORMATION

This application claims the benefit of U.S. Provisional Patent Application No. 63/307,976, filed Feb. 8, 2022, titled "System and Method for Hybrid Power Generation with Grid Connection," the contents of which are hereby incorporated herein in its entirety.

TECHNICAL FIELD

This disclosure generally relates to high horsepower, micro-grid power generation and usage.

BACKGROUND

Many industrial applications need a lot of power to operate. Many use generators powered by diesel gas and other hydrocarbons because of the high-power needs. The burning of hydrocarbons creates pollution. Minimizing the pollution created by drilling rigs can bring good benefits to the environment as well as save money.

BRIEF SUMMARY

One embodiment of the present disclosure includes a controller for a high horse-power micro-grid. The controller can comprise one or more connections to one or more generator sets (gensets) configured to turn each of the one or more gensets on and off and detect power produced by each of the one or more gensets; and may comprise a power grid connection or an optional connection coupled to a back-to-back inverter coupled to a power grid. It can further comprise a power connection to one or more battery units; wherein the controller is configured to detect changes in power demand on the high horse-power micro-grid and further configured to, if a change in power demand is detected, supply a difference in power output between one or more micro-grid power producers and one or more micro-grid power consumers by supplying power from the one or more battery units to overcome a power deficit or importing excess power to the one or more battery units to relieve a power overage.

Another embodiment under the present disclosure includes a controller for a high horse-power micro-grid. The controller can comprise one or more connections to one or more genset controllers configured to adjust a throttle position of one or more gensets and to detect demand and output of each of the one or more gensets and a connection to a grid switch configured to turn on/off a connection to a utility grid. It can further comprise a power connection to one or more battery units configured to supply power during a power deficit and to store power during power overages; wherein as demand at any of the one or more gensets changes, the controller is configured to supply or collect battery power so as maintain a power draw from the utility grid at a constant level or to limit power variation over time ($\Delta P/\Delta t$, otherwise known as line flicker).

A further embodiment under the present disclosure can comprise a method performed by a hybrid energy controller for controlling a high horse-power micro-grid. The method can comprise powering on at least one of one or more gensets; detecting power output from the one or more gensets; detecting overall power demand on the high horse-power micro-grid, and comparing the overall power demand to the power output. Further, if the overall power demand is greater than the power output, then supplying the difference with battery power from one or more battery units; and if the overall power demand is less than the power output, then storing the excess power in the one or more battery units.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

The foregoing has outlined rather broadly the features and technical advantages of the present invention in order that the detailed description of the invention that follows may be better understood. Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which:

FIG. 2 shows graphs of generator set efficiency;

FIG. 17 shows a drilling rig embodiment under the present disclosure and a graph of its respective activity;

FIG. 20 shows specifications for an embodiment of a micro-grid system under the present disclosure;

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Industry is seeking to lower carbon intensity and lower costs. Embodiments under the present disclosure include generator sets (gensets) and hybrid power systems and controllers of the foregoing that help industrial customers, such as oil and gas drillers, to address this emissions challenge while improving performance. Hybrid energy management systems under the present disclosure can use battery energy storage and engine automation to reduce the number of gensets operating and increase the fuel efficiency of the rig. One technique for achieving fuel savings includes automatically turning gensets on and off and reducing the overall number of gensets running at any given time. An effective control scheme on a micro-grid system is useful for attaining such a reduction without adversely affecting the rig's tools' performance (e.g., drawworks speed, power limits) and allowing customer adoption for a commercially viable product. A controller can be implemented with artificial intelligence (AI) functionality to monitor power generation to meet power demand. Batteries can provide the buffer of energy to optimize the number of gensets operating and ultimately the fuel efficiency and emission of the rig.

Objectives of embodiments under the present disclosure include reducing diesel consumption with battery energy storage and engine automation using available "highline" power (grid utility power lines) on those drilling rigs which have access to the grid; use as much highline power as is available; eliminate as much as possible the need for complex utility studies and permitting; use a rig's gensets without any modifications; use fewer gensets; and use the rig's existing infrastructure. Challenges overcome by the disclosed embodiments include: highline power often has limited capacity; constraints are often imposed on the manner in which power is consumed; and difficult to meet utility requirements for highline power connections.

Figure 1:
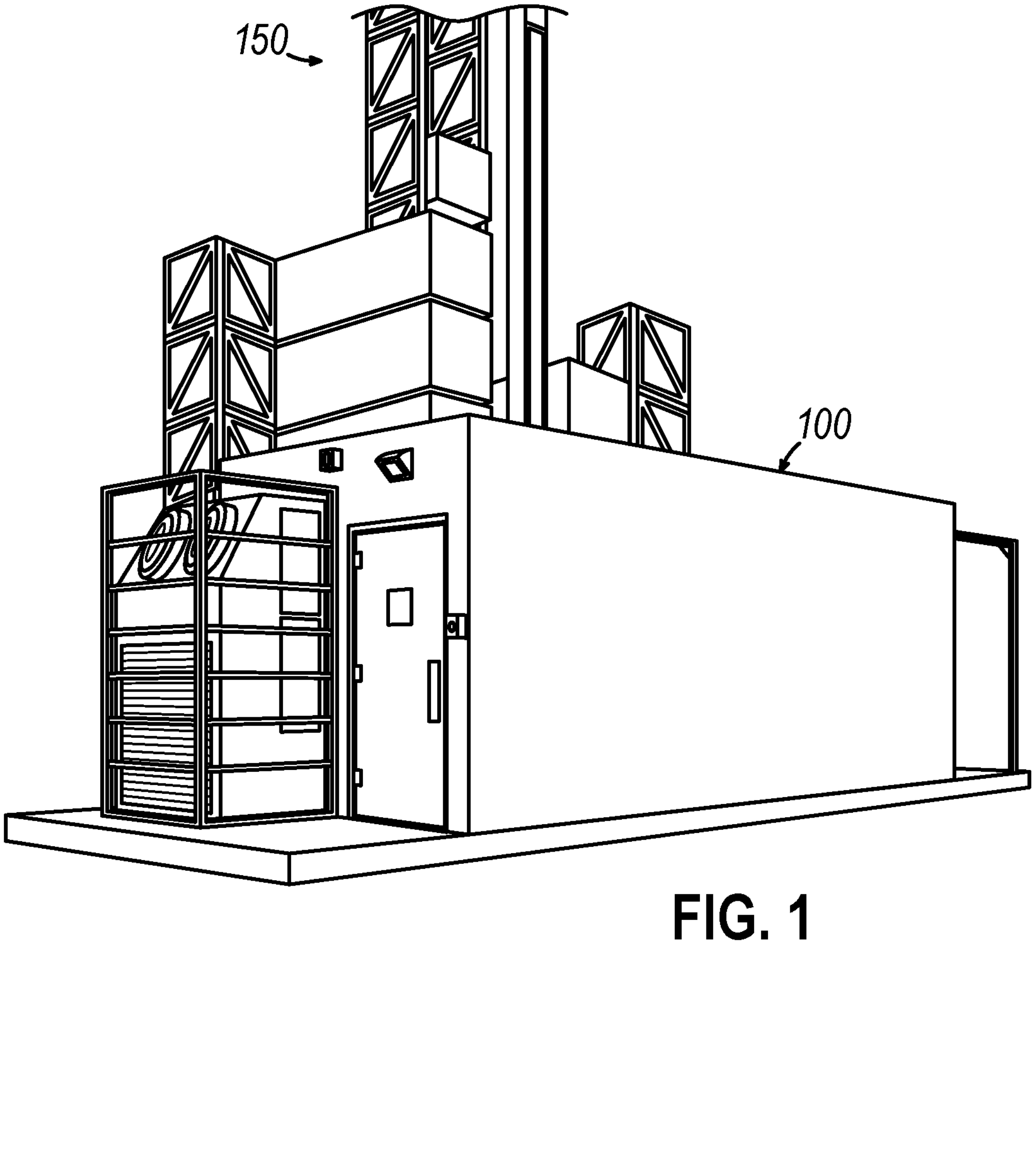
FIG. 1 shows an embodiment of a drilling rig under the present disclosure.

A micro-grid control system embodiment under the present disclosure can be seen in FIG. 1. System 100 can comprise a plurality of battery units inside, cooling equipment, connections for a power grid and other components and other machinery. System 100 can be coupled to a power grid (not shown here), drilling rig 150, and gensets (not shown here).

Prior art drilling rigs used multiple gensets running in a microgrid island configuration. Connecting these micro-grid islands to the utility requires a change in controls topology which can be cost prohibitive for operators. Without such changes, rigs will not be permitted to make use of highline power in remote areas where the capacity does not permit it. These setups can be inefficient and highly polluting because multiple gensets are run at the same time to avoid blackouts and power limits. Because multiple gensets are running, none of the running gensets has to run at a high load, each genset can run at a low load. However, efficiency for each genset is better at high loads (see FIG. 2), and pollution/emissions are higher at low loads (see FIG. 2). By running each genset at low load, the system as a whole is less efficient and more polluting. Power generation systems at oilfield locations can also run into problems with integrating into a power grid and will generally not attempt highline connections unless the conditions are extremely very favorable; this means that only a select few rigs will make use of highline.

Embodiments under the present disclosure can solve the prior art problems with a hybrid system and controller. In order to reliably and cost effectively tie a micro-grid to a utility grid (in grid-tie configuration), precise and timely control of the power at the point of common coupling ("PCC") is implemented; specifically control of reactive power (kVAR), harmonics, peak power, and dP/dt line flicker (rate of change of power drawn from utility grid). To achieve this, certain embodiments implement a power control-loop based on the power feedback from the PCC and the main power producers of the micro-grid, including but not limited to active power-electronics (e.g., AC inverters) and traditional prime-mover power sources (such as diesel-based generators or gas turbines).

One reason embodiments under the present disclosure differ from prior art is because power-electronics are traditionally controlled on other process values (such as frequency or voltage) which are locally visible to the individual components of the micro-grid (i.e. each connected component can independently sense the bus voltage and frequency without needing remote feedback), or systems which are designed to load share between producers while still delegating control loop functionality to individual devices, or systems which are all centrally controlled.

Certain embodiments described herein do not require a centralized controller requiring all power producers to be governed centrally, rather described embodiments can make use of the power feedback from all power producers (including the PCC) to control a single power producer (inverter), or a series of inverters acting in combination as a single unit, with the goal of indirectly controlling the independent power producers (by way of gross power output and not controls integration).

Embodiments described can achieve the purported goal by being a bi-directional load on the power bus which acts as an independent consumer or producer of power and matching the actual real loads of the bus (e.g., various tools and consumers) so as to make it appear to the power producing components that the consumed total load is more constant (or less erratic) than it is.

Figure 3:
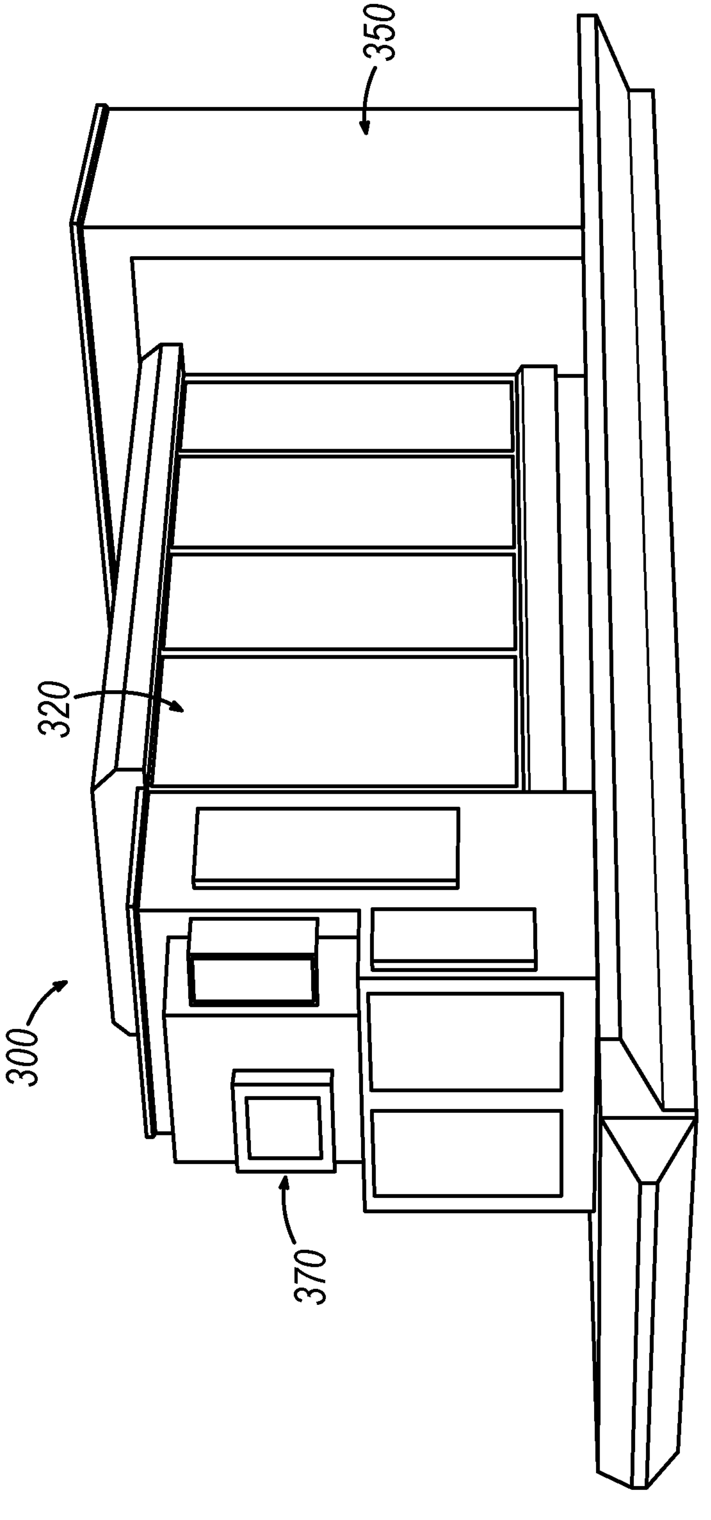
FIG. 3 shows an embodiment of a hybrid system under the present disclosure.

FIG. 3 displays a micro-grid control system embodiment under the present disclosure. Controller 300 can be considered a hybrid control system or hybrid controller, due its functionality in certain embodiments to control both fuel power (gensets) and battery power. Controller 300 comprises three main components, batteries 350, power conversion equipment 320, and advanced automation and controls 370 (such as processors, data storage, user interfaces and related functionality). The batteries 350 can deliver power and bridge the warm-up time when starting up another genset. The controls 370 can turn gensets on/off so as to achieve fuel and emissions savings. The power conversion equipment 320 can deliver e.g., the power of ~1.5 gensets.

Figure 4:
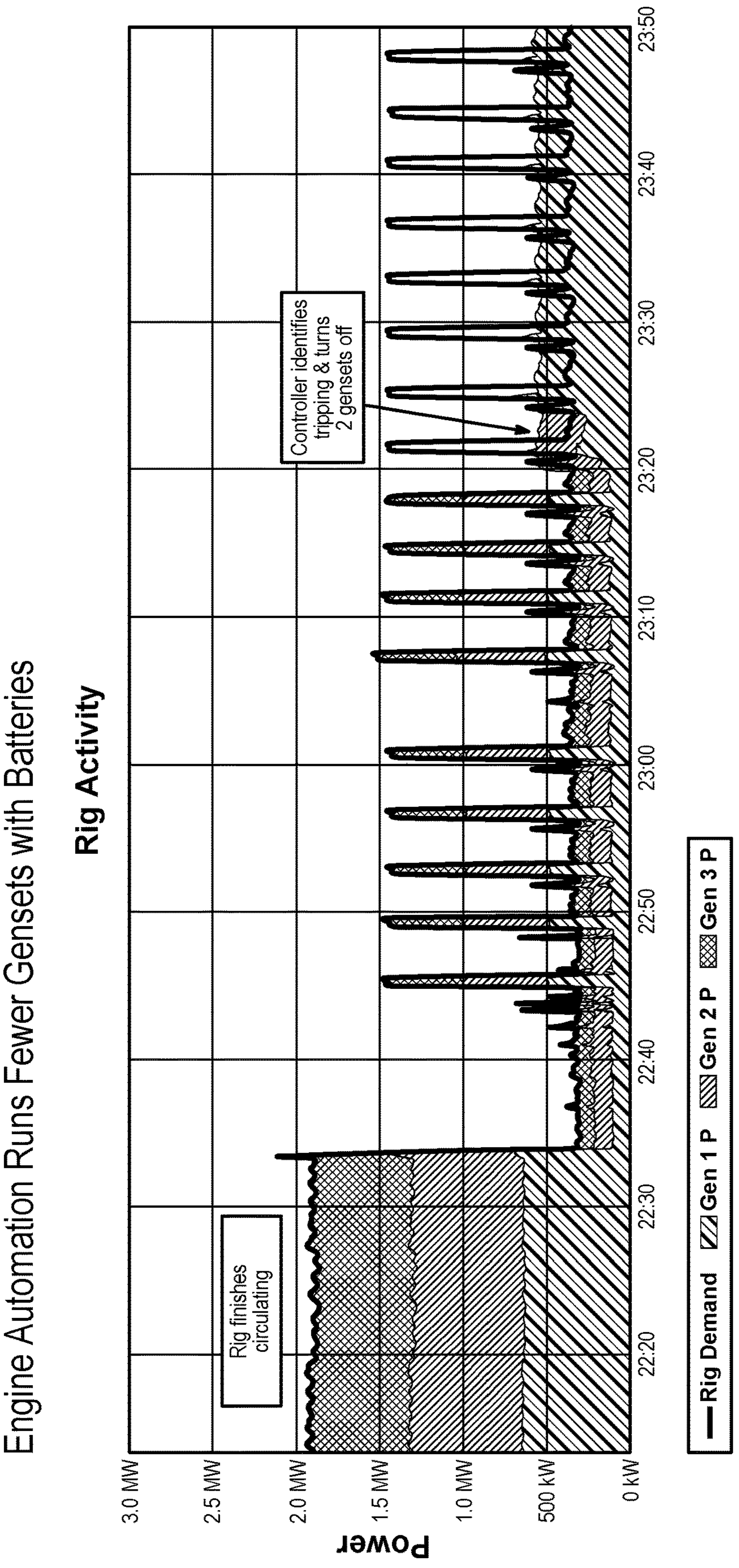
FIG. 4 shows a graph of drilling rig activity with a hybrid system under the present disclosure.

FIG. 4 shows an example of a graph of rig power demand over time for a system embodiment under the present disclosure. As the rig finishes circulating, the controller can monitor the power demand and reaction of the three gensets (Gen 1/2/3 P). The controller identifies the power behavior and tripping (shown as spiked power demands) and is able to turn off two gensets. As a result, instead of running three gensets at low load, just one genset can be run at a higher load (i.e., more efficient). Battery power from the control system can be used to supplement the one genset when the rig demand is higher than the one active genset can provide. The controller monitors the drilling rig's power demand and optimizes the number of gensets running. For example, the system turns off gensets to save fuel and emissions during tripping. Batteries instantly provide the additional power required.

Figure 5:
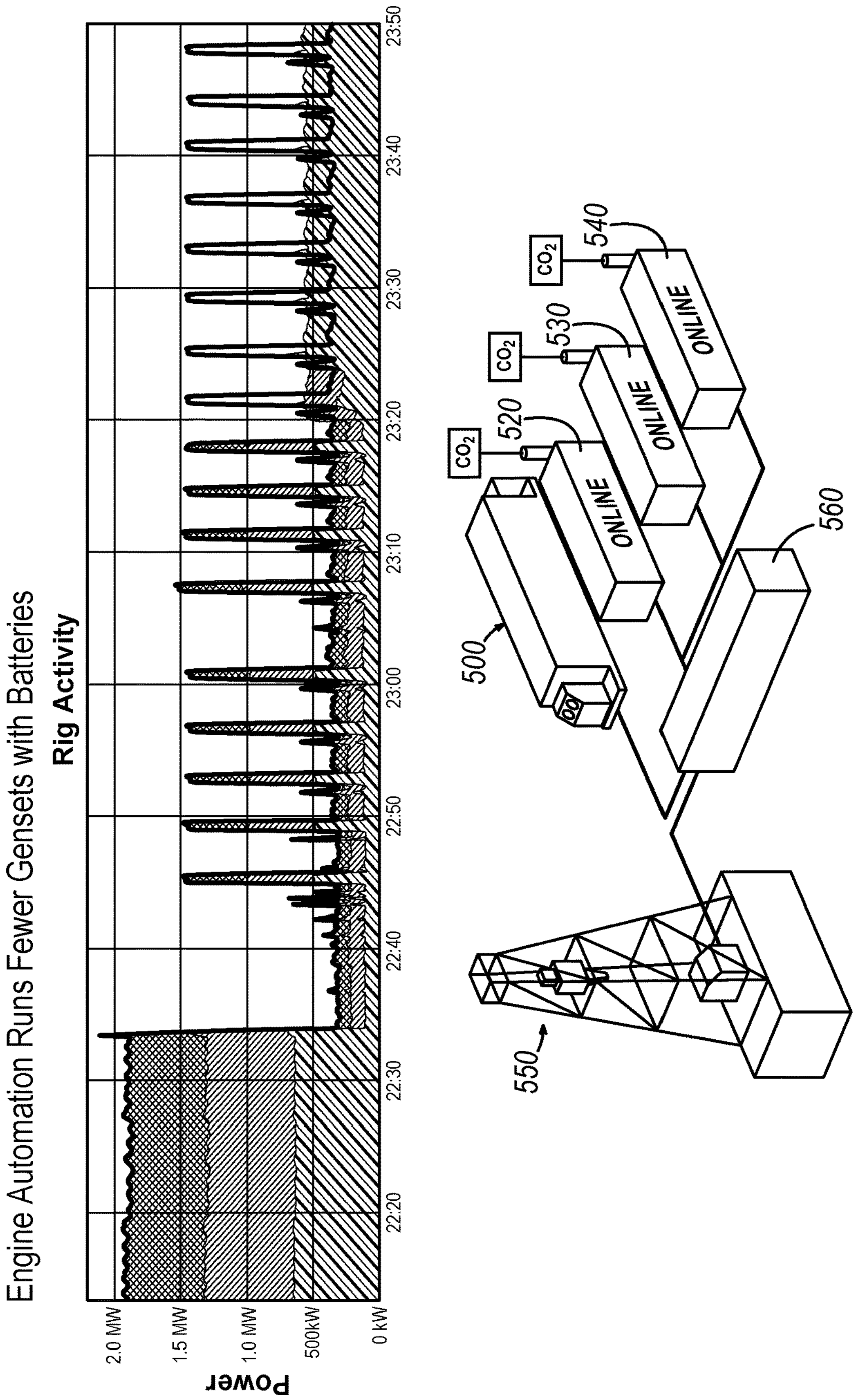
FIG. 5 shows a drilling rig embodiment under the present disclosure and a graph of its respective activity.

FIG. 5 shows a how a controller 500 might be coupled to gensets 520, 530, 540, variable drive 560, and rig 550. The embodiment of controller 500 can achieve the behavior shown in FIG. 4. Controller 500 can run all three gensets 520, 530, 540 to start. But after analyzing the power demand of rig 550, controller 500 can turn off two gensets 530, 540, and just run genset 520, supplying battery power for high demand moments.

Figure 6:
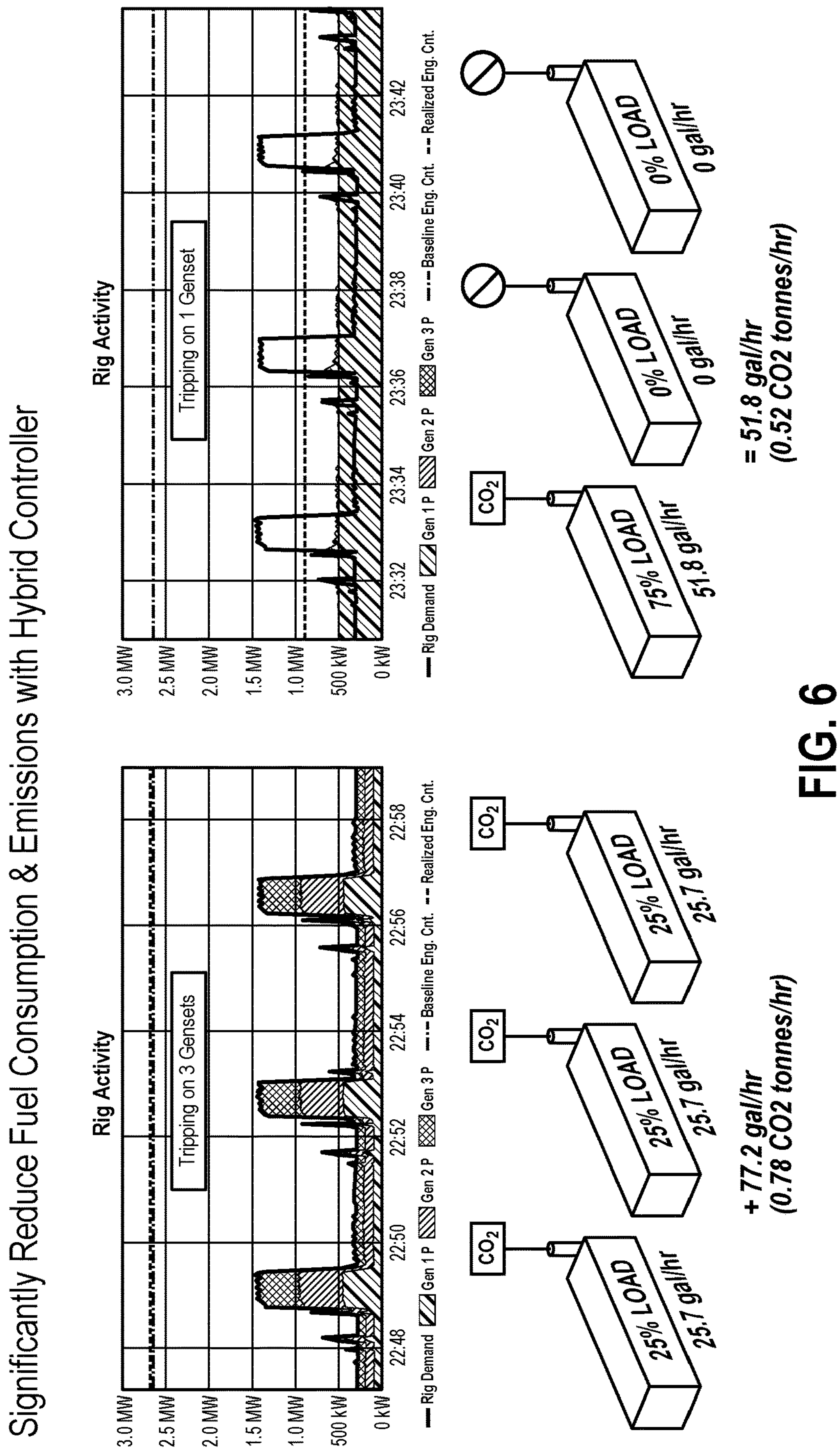
FIG. 6 shows graphs illustrating the impact of utilizing drilling rig embodiments under the present disclosure.

FIG. 6 shows possible fuel savings, and efficiency improvements with the improvements described e.g., at FIGS. 4-5. Running three gensets at low loads (e.g., 25%) can result in fuel consumption of 77.2 gal/hr. and resulting emissions. Tripping on one genset and running it at 75% load and using battery to make the difference in demand when needed, can result in fuel consumption of 51.8 gal/hr. and resulting reduced emissions Exact savings can depend on the exact specifications of the rig, gensets, batteries, geographical, topographical (e.g., altitude), or other variables.

Figure 7:
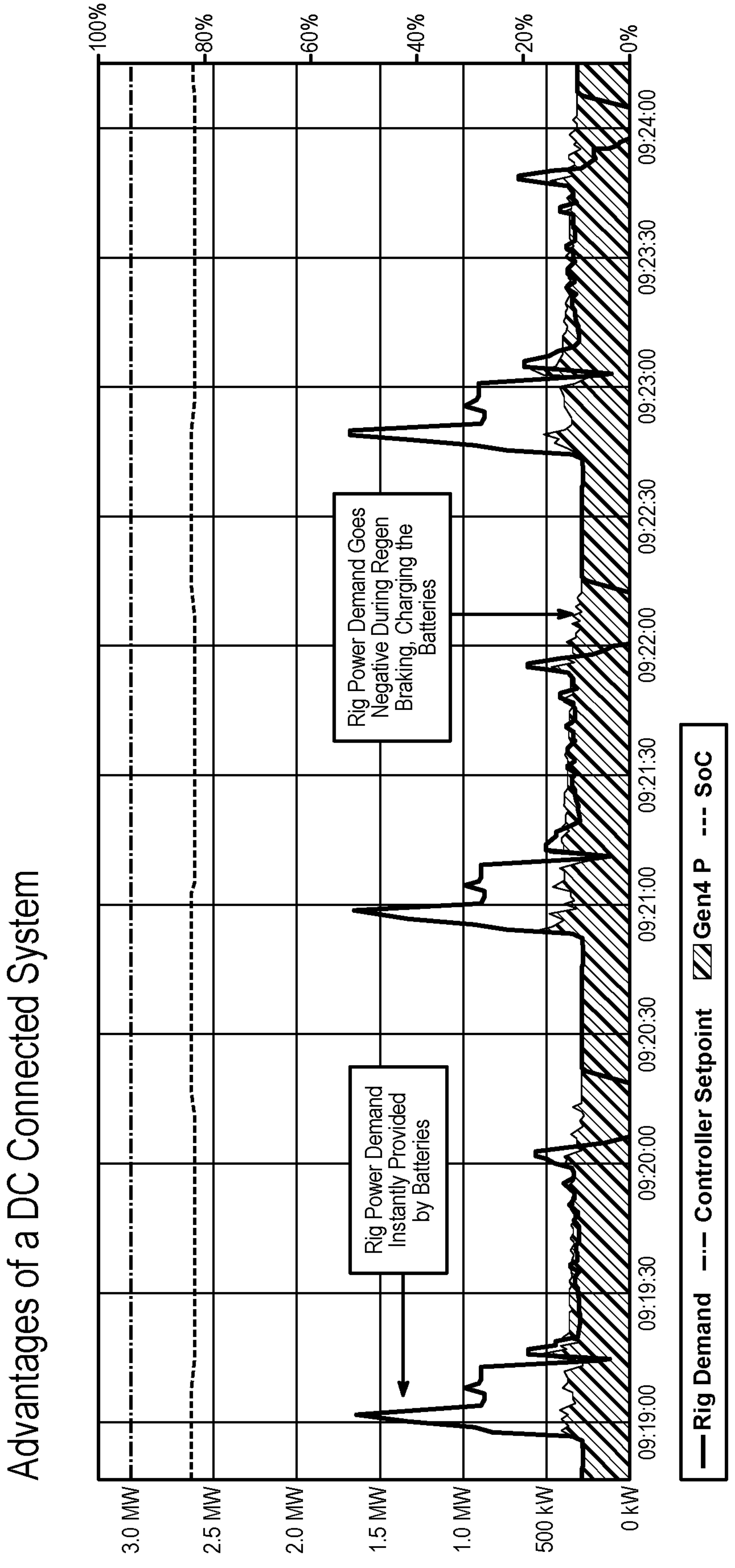
FIG. 7 shows a graph illustrating the impact of utilizing drilling rig embodiments under the present disclosure.

FIG. 7 shows a demand graph of a controller embodiment under the present disclosure showing the advantages of a DC connected system. In this embodiment a single genset (Gen4 P) is running. When rig power demand (white trendline) goes above that power supplied by Gen4 P one or more battery units can provide power to match the demand of the rig. When rig power demand goes negative during regenerative braking the batteries are charged. This allows the system to capture regenerative energy that would have otherwise been burned off as waste heat.

Figure 8:
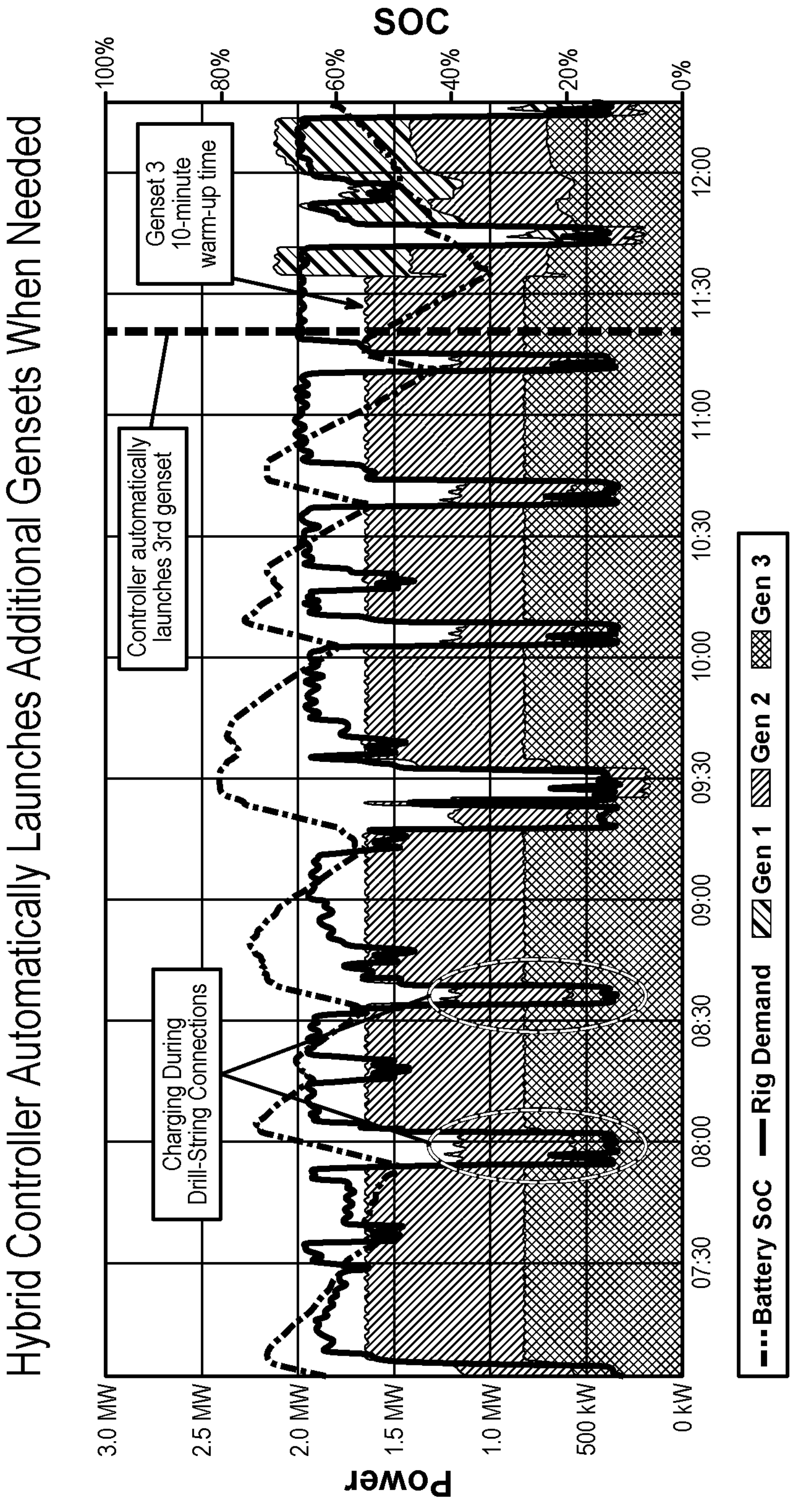
FIG. 8 shows a graph illustrating the impact of utilizing drilling rig embodiments under the present disclosure.

FIG. 8 shows how a controller can turn on additional gensets as needed. The power demand graph shows power demand during a drilling operation. For the first period of time two gensets are turned on. As power demand goes negative the batteries can be charged. As the drilling rig gets deeper it needs more power and the controller turns on another genset. Batteries allow fewer generators to be operated. Additional gensets are automatically launched by the controller when needed, and the battery provides the power required during the gensets warmup period.

Figure 9:
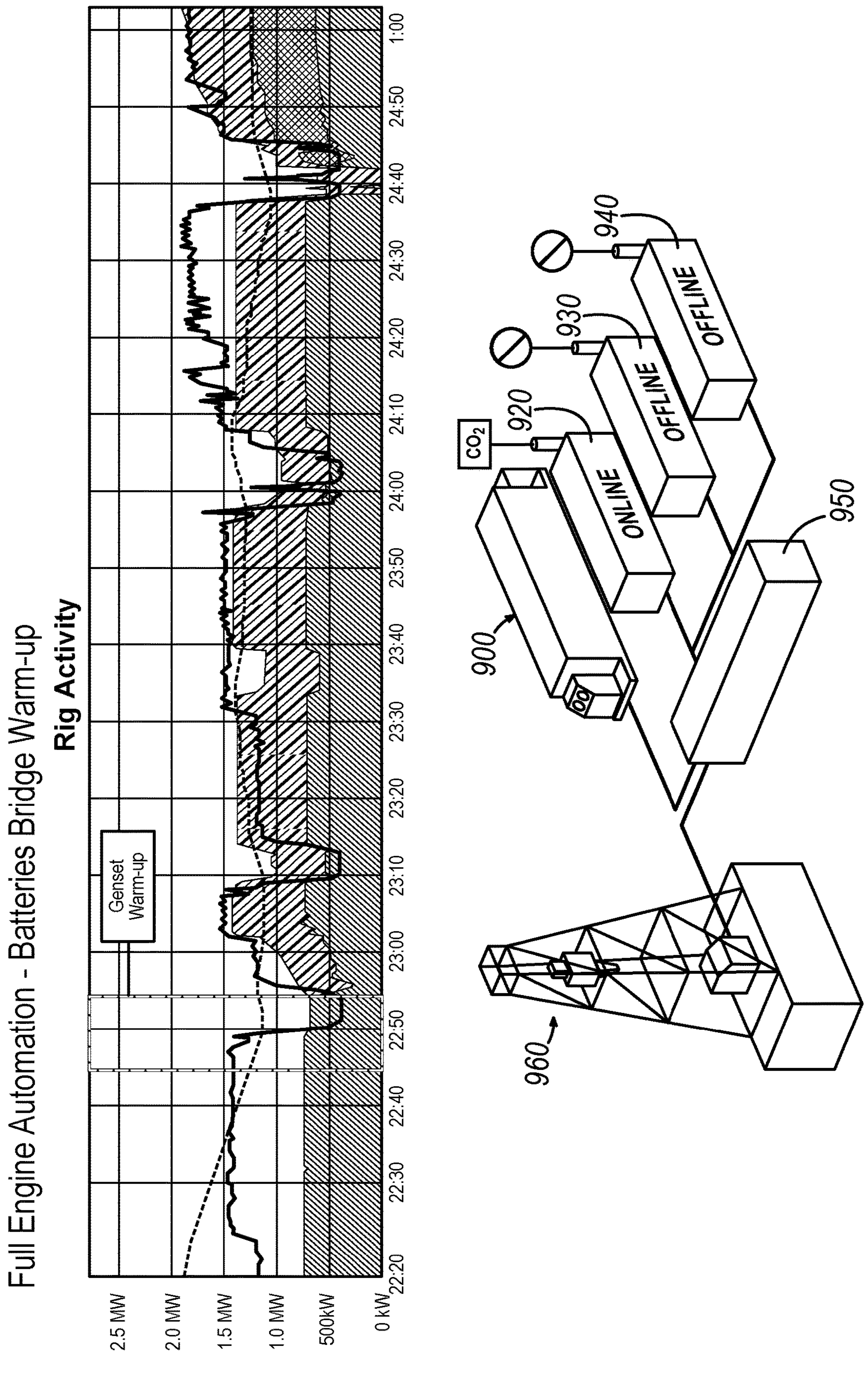
FIG. 9 shows a drilling rig embodiment under the present disclosure and a graph of its respective activity.

FIG. 9 is an embodiment of starting up gensets as power demand increases. Gensets 920, 930, 940 provide power to variable drive 950 and drilling rig 960. Controller 900 can control the operation of gensets 920, 930, 940. At the first time period, only one genset 920 is running, but a second genset 930 is added for second time period. For a third time period, the third genset 940 is powered on. Each genset needs a warm-up time 980 before it can be closed onto the microgrid and participate in power production. The VFD house 950 can receive power from the batteries (coupled to controller 900) to bridge the power demand during those warm-up times 980.

Figure 10:
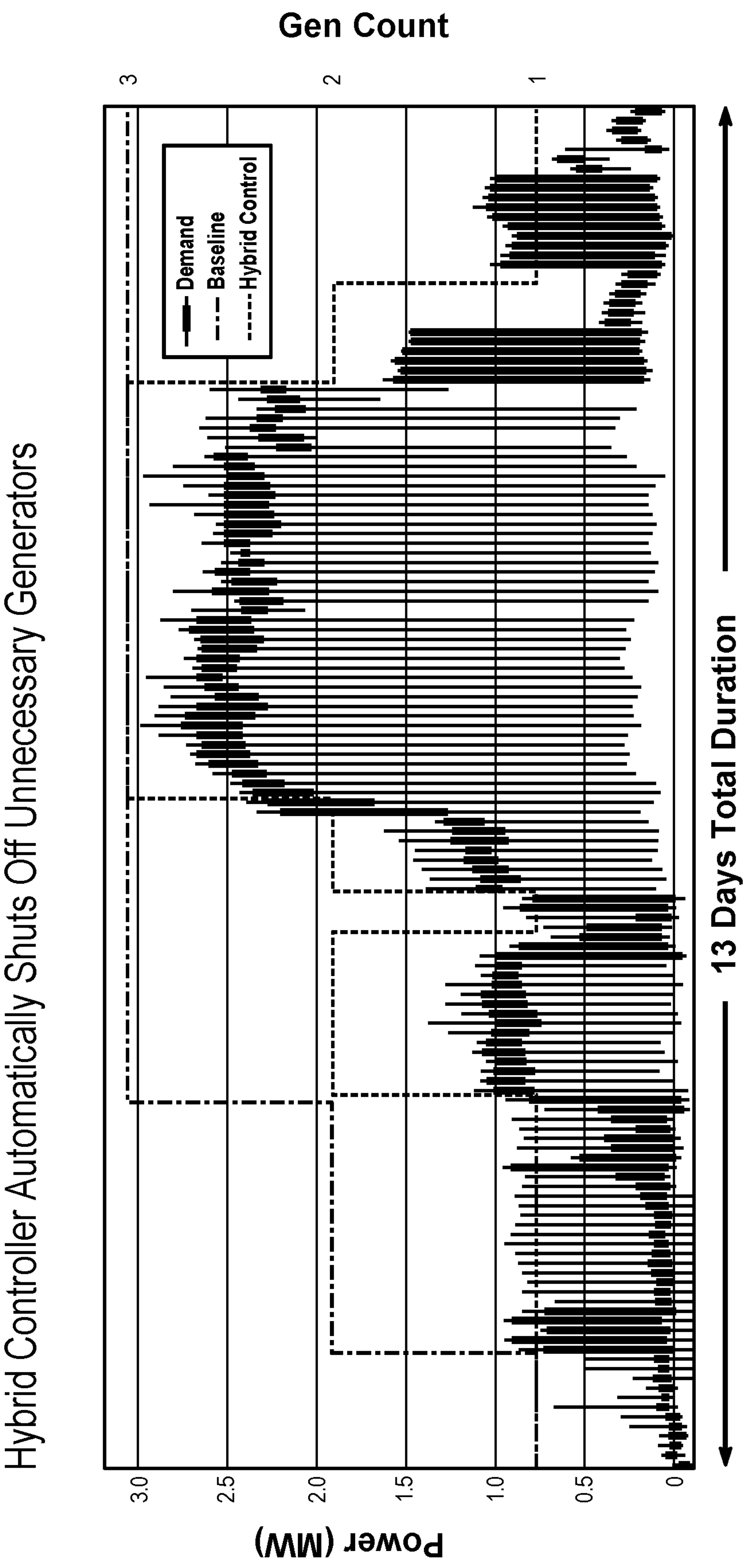
FIG. 10 shows a graph illustrating the impact of utilizing drilling rig embodiments under the present disclosure.

FIG. 10 shows an example of fuel savings in a live test performed by the applicant. Both a baseline (representing prior art) and a hybrid control (embodiment of the present disclosure) line are shown responding to the same demand of a rig over 13 days. As shown, where the baseline power is above the hybrid control line, the prior art genset embodiment is consuming more fuel and creating more pollution. The hybrid control embodiment, by turning off unnecessary gensets and making up for rig demand with battery power, uses less energy. In this example, the hybrid control embodiment consumes 20,845 gallons of diesel while the prior art genset system consumes 24,630 gallons. During this time the prior art system uses 2.7 gensets and the hybrid control embodiment uses 1.8 gensets.

Figure 11:
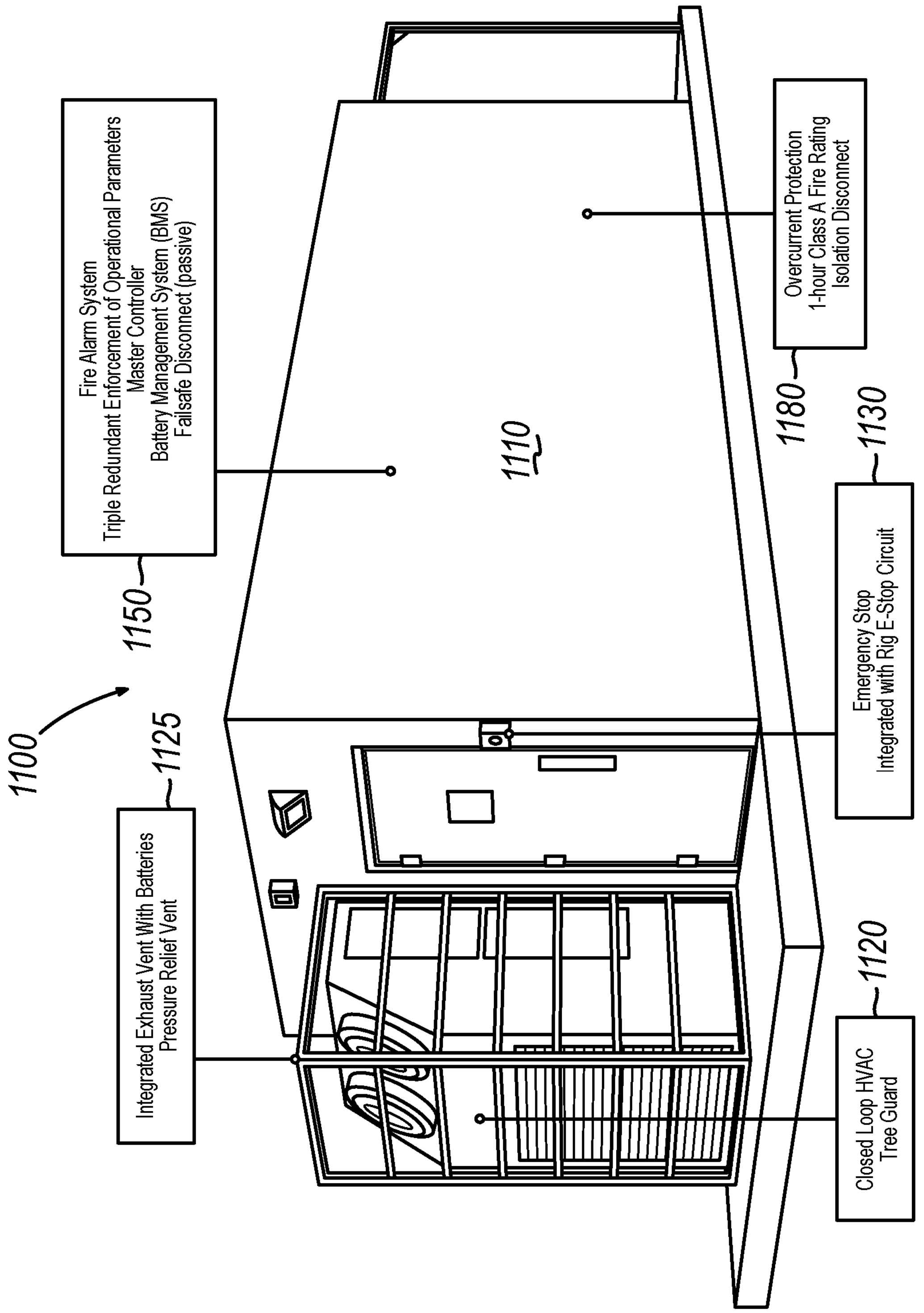
FIG. 11 shows an embodiment of a hybrid system under the present disclosure.

FIG. 11 shows a controller embodiment under the present disclosure. The controller system 1100 can comprise a portable room 1110 comprising batteries 1180 (internal), a fire alarm system 1150 (internal), HVAC 1120 and other components. The internal fire alarm system 1150 can comprise triple redundant enforcement operational parameters, master controller, battery management system (BMS), and failsafe disconnect (passive). Batteries 1180 can comprise marine grade batteries with cell level thermal runaway fire protection. HVAC can include integrated exhaust vent 1125 with batteries and pressure relief vent, with closed loop HVAC and tree guard to protect from outside trees or other bodies. There can be an emergency stop 1130 (booth doors inside battery house, and VFD house), integrated with Rig E-stop circuit. Batteries 1180 can have overcurrent protection, 1-hours class a fire rating (wall insulation), and isolation disconnect (full load rated).

Figure 12:
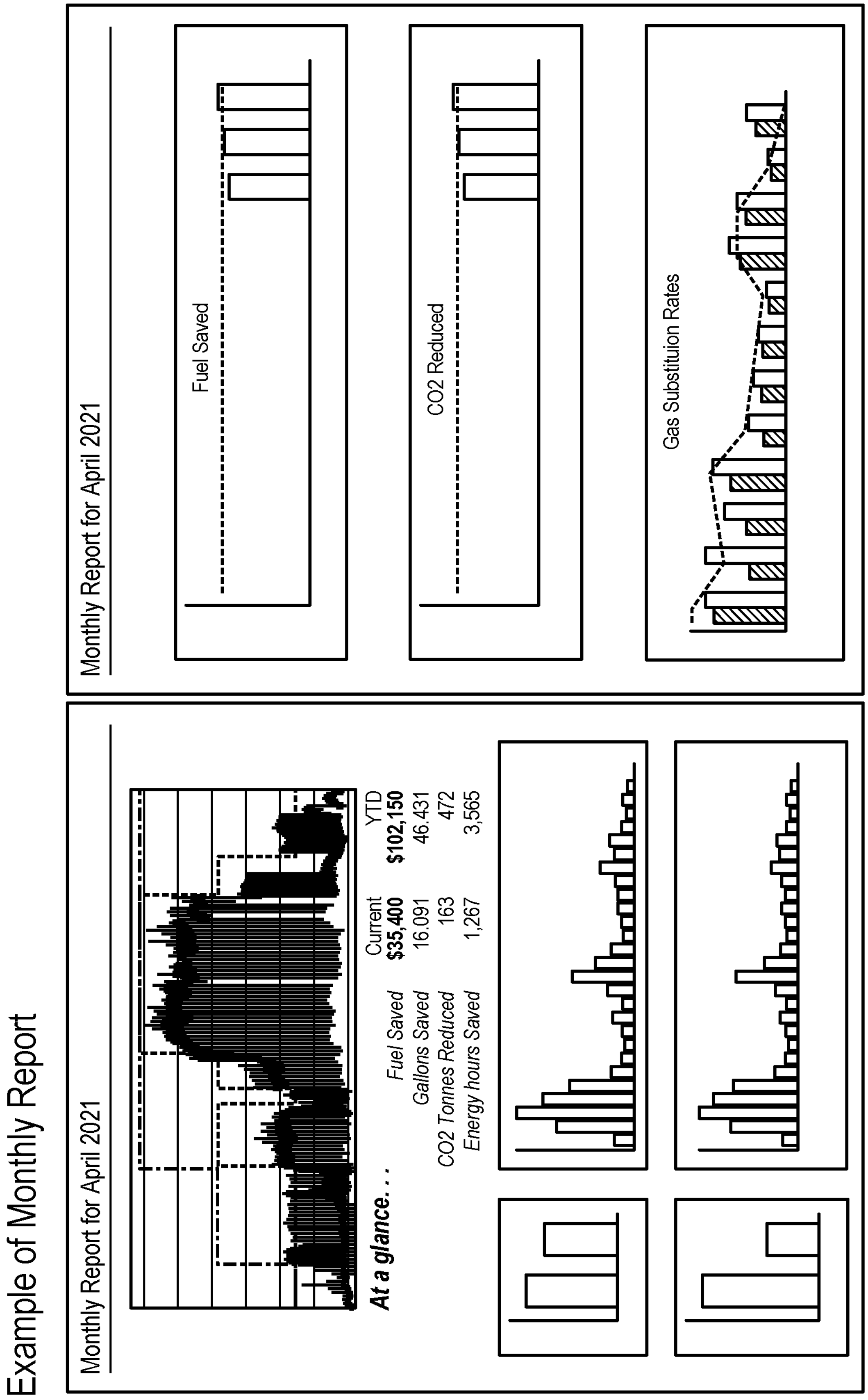
FIG. 12 shows an embodiment of monthly report and data under the present disclosure.
Figure 13:
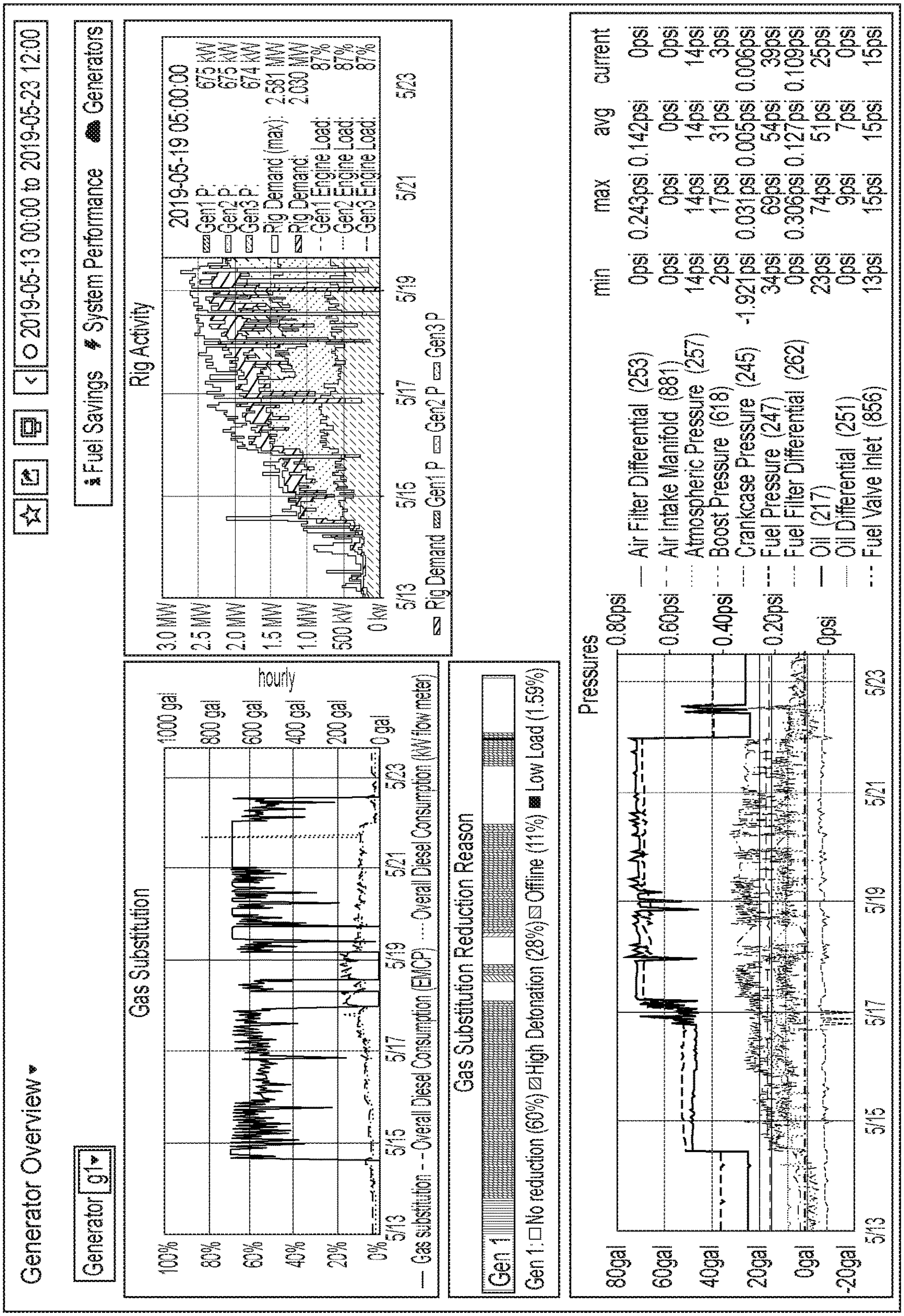
FIG. 13 shows an embodiment of data tracking under the present disclosure.

Controller embodiments under the present disclosure can track, analyze, store, and provide monthly reports regarding energy usage, behavior, demand, savings, and other data. Examples of possible reports are shown in FIG. 12. FIG. 13 shows another embodiment of a monthly report or periodic tracked data.

Figure 14:
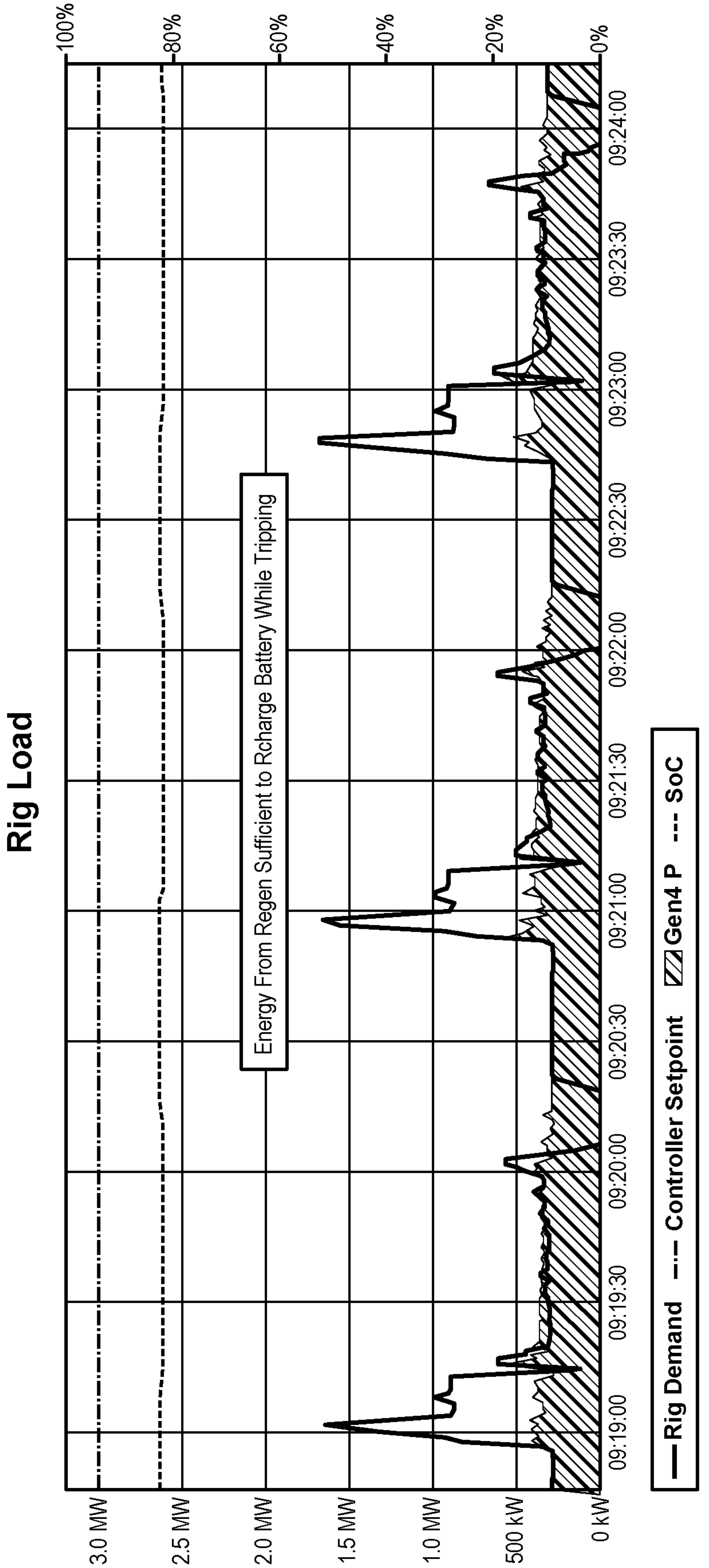
FIG. 14 shows a graph illustrating the impact of utilizing drilling rig embodiments under the present disclosure.

FIG. 14 shows a power demand graph and how batteries can recharge using regenerative energy.

Figure 15:
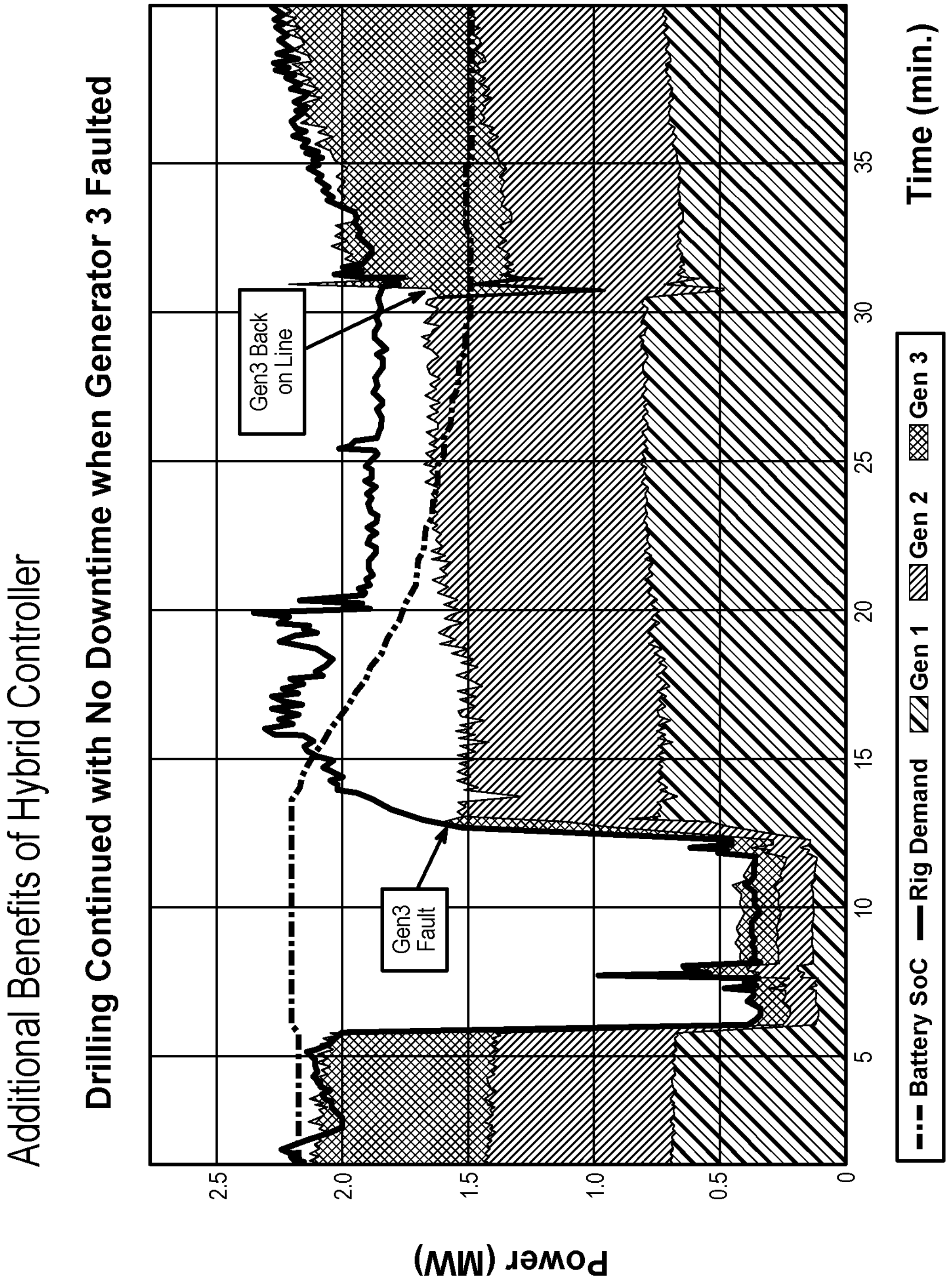
FIG. 15 shows a graph illustrating the impact of utilizing drilling rig embodiments under the present disclosure.

FIG. 15 shows how battery power of an embodiment under the present disclosure can keep a rig running if a genset fails. In this embodiment, Gen 3 faults, but battery power from the control system is regulated to make up for the difference. The battery is able to keep the rig running at the desired level until the Gen 3 is back up and running.

Figure 16:
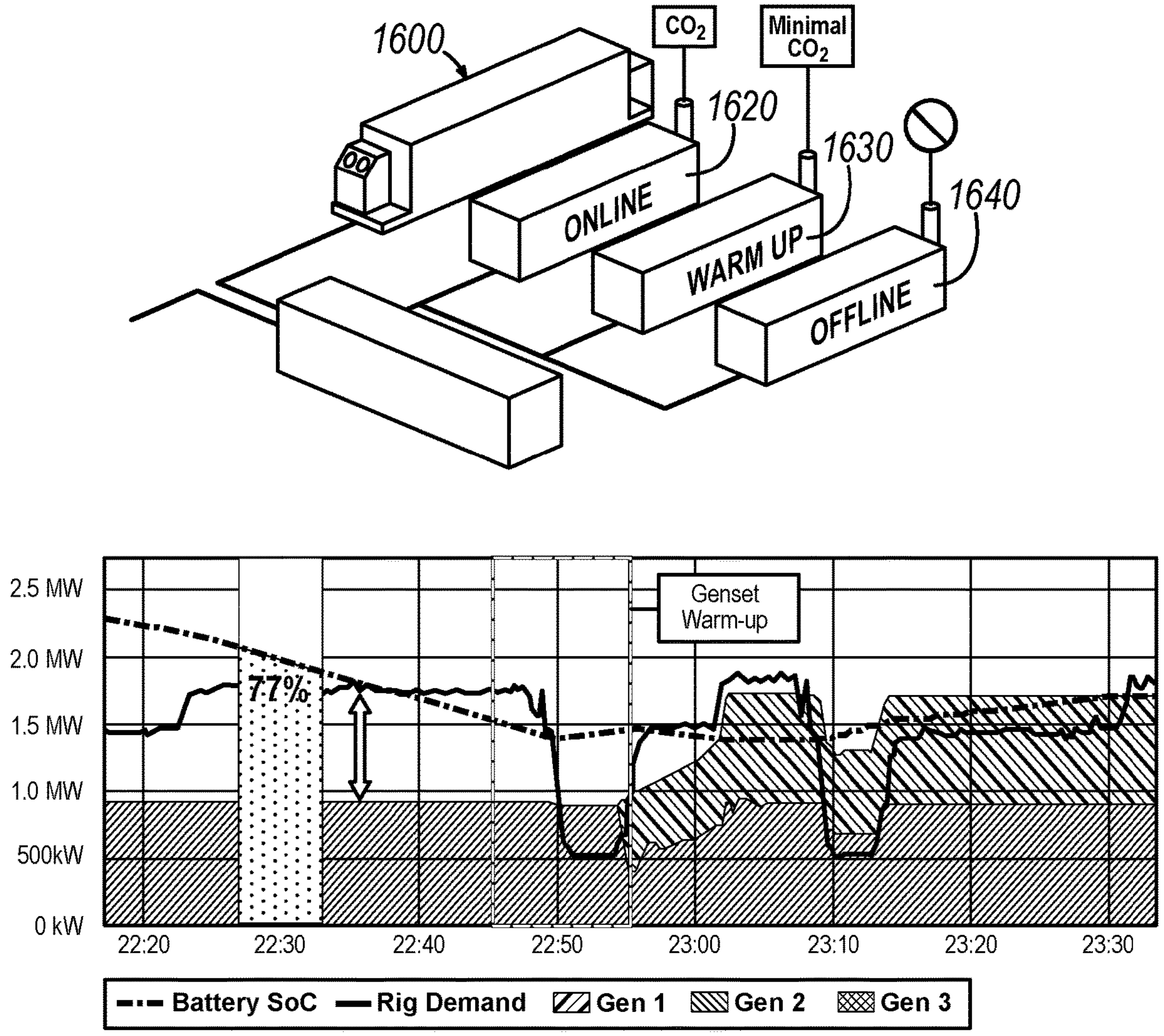
FIG. 16 shows a drilling rig embodiment under the present disclosure and a graph of its respective activity.

As discussed above, control system embodiments can automatically launch gensets when needed and provide power to bridge warmup time for gensets coming online. There may be a margin of energy to provide a safety for the system. For example, as shown for illustrative purposes only in FIG. 16, as the controller 1600 brings on gensets 1620, 1630, 1640, the controller 1600 may track a safety margin of energy, or state of charge remaining in the batteries (within controller 1600). If the batteries go below e.g., 30% state of charge then the status of another genset 1620, 1630, or 1640 coming online can be checked to ensure the system can meet upcoming or current demands.

Certain embodiments may control the batteries and gensets so as to avoid a maximum setpoint of the gensets. This can be seen in FIG. 17. While the batteries (within controller 1700) provide power, load on the gensets 1720, 1730, 1740 can preferably be kept at or under a maximum setpoint. By keeping gensets 1720, 1730, 1740 under the setpoint, power limits are avoided. In the unlikely event of rig demand hitting a power limit, the batteries can continue to provide power but will cease charging and another genset 1720, 1730, or 1740 will be launched.

Figure 18:
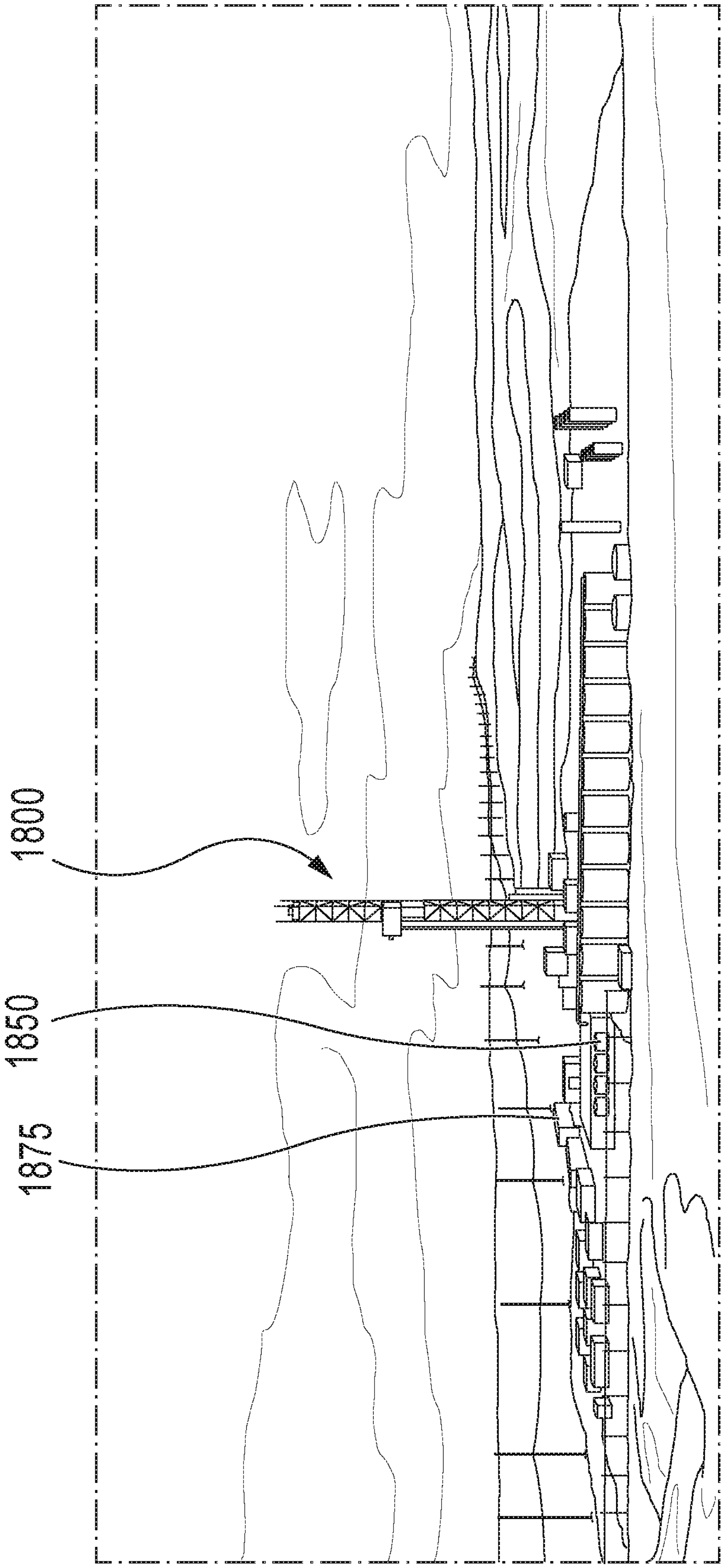
FIG. 18 shows an embodiment of a drilling rig under the present disclosure.

FIG. 18 shows a possible field installation of a control system 1875, coupled to rig 1800 and one or more gensets 1850.

Figure 19:
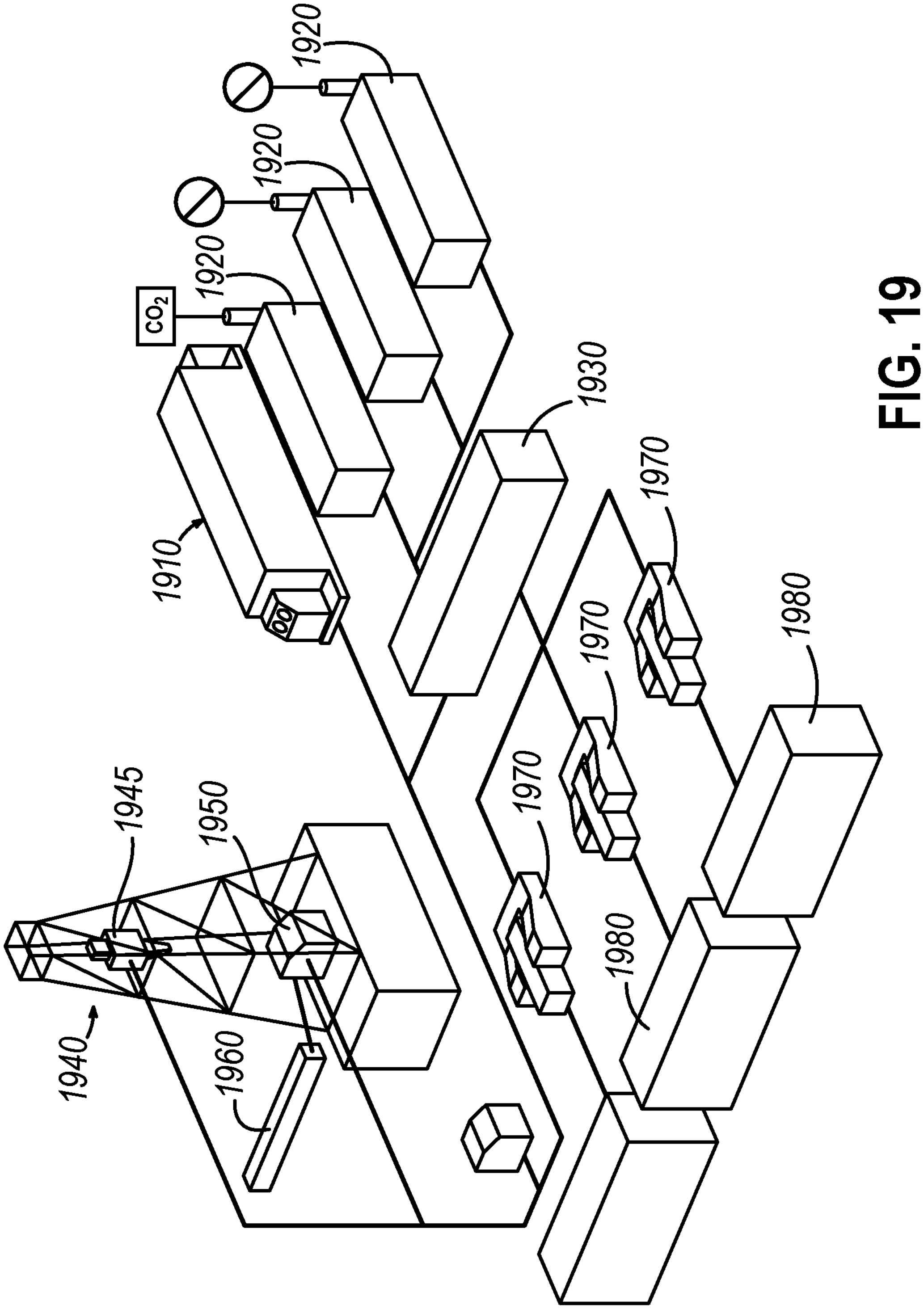
FIG. 19 shows an embodiment of a drilling rig under the present disclosure.

FIG. 19 shows a more detailed embodiment of a possible field installation under the present disclosure. Controller 1910 is coupled to gensets 1920 via variable drive 1930. Top drive 1945 on rig 1940 and drawworks 1950 are also coupled to variable drive 1930. Pipe handling equipment 1960 is coupled to rig 1940. Additional hydraulic components 1970, such as a shaker, are also coupled to the variable drive 1930, top drive 1945, and drawworks 1950. Mud pumps 1980 are coupled to variable drive 1930.

FIG. 20 shows possible specifications for a control system embodiment, such as controller 1910 of FIG. 19.

Figure 21:
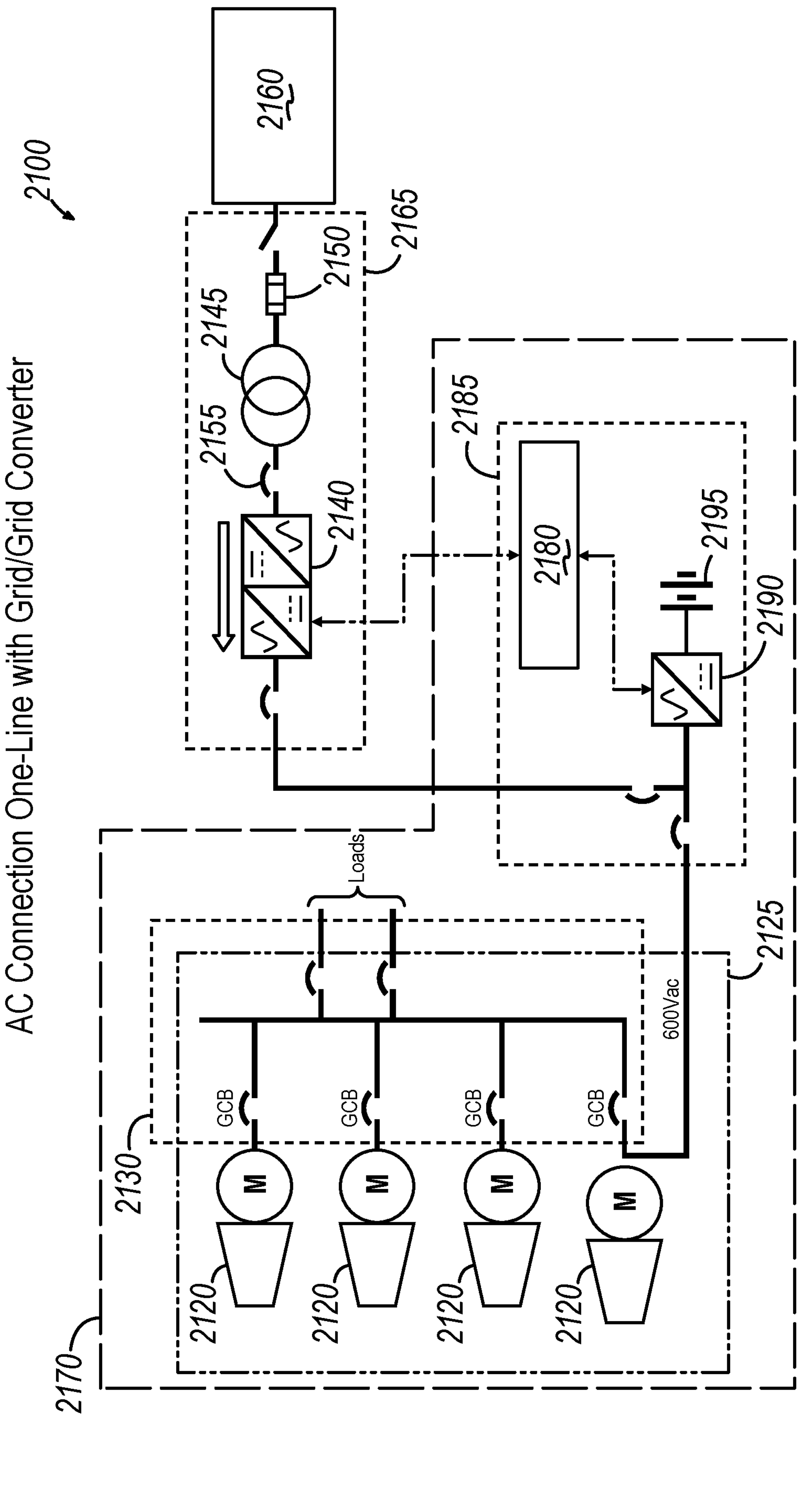
FIG. 21 shows a circuit diagram of an embodiment of a micro-grid system under the present disclosure.

FIG. 21 shows a control system for a micro-grid embodiment with an AC connection and a grid/grid converter (or back to back inverter). Grid connection 2150 provides a connection to a power grid/utility 2160. Isolation transformer 2145 and connection 2155 provide a e.g., 600 AC voltage connection to back to back inverter 2140. Isolation transformer 2145 can have a 600/600 with 480V tap setup. Other arrangements are possible. Isolation transformer 2145 allows utility grid 2160 to have its own grounding scheme. These elements together comprise the isolation skid (island grid to utility grid) 2165 helping to isolate the island grid 2170 from the utility grid 2160. One goal of such an embodiment is for the utility grid 2160 to see the back-to-back inverter 2140 as a load only. No reverse power flow to the utility grid 2160 can be programmed into the back-to-back inverter 2140 controls. Regardless of the rig load, the back-to-back inverter 2140 provides: a) controlled power draw from the utility grid 2160 with adjustable limits; b) controlled power ramp rates to eliminate line flicker; c) unity power-factor ("PF") loading of the utility grid 2160; and d) active inverter rectification isolates associated harmonics from diode rectifiers on the rig; and e) isolates utility grid frequency from the micro-grid.

Control skid 2185 sits between the isolation skid 2165 and the variable frequency drive (VFD) house 2130. Control skid 2185 together with the VFD house 2130, gensets 2120 and other components make up the island grid 2170. Control skid 2185 comprises a controller 2180, battery(ies) 2195, and battery inverter 2190. Controller 2180 is coupled to the back-to-back inverter 2140 on the isolation skid 2165 and can control it thereby. The gensets 2120 and VFD house 2130 together make up the drilling rig microgrid 2125. In addition to ramped power settings in the battery inverter 2185, the control skid 2185 provides dP/dt control of the rig microgrid 2125.

Grid connection 2155 can be set to open on grid outage. One challenge in the prior art solutions is that they focus on controlling frequency, allowing the rig to adjust genset power to whatever frequency is needed. One aspect of solutions under the present disclosure is controlling power through the use of batteries 2195. In order to do that, the controller 2180 should know what power demand is from the rig microgrid 2125. The gensets 2120 can be set to operate at a specific power e.g., 500 kw, and when power need goes higher, battery(ies) 2195 supplies the difference. As shown in the embodiment of FIG. 21, the controller 2180 doesn't have a control line over the power level of the gensets 2120. Controller 2180 just gets feedback from the gensets 2120 and can power them on/off. The connection between the controller 2180 and the genset 2120, in this embodiment, aggregates the total load on the gensets 2120 (it doesn't see individual demand on each genset) and the controller 2180 can see the output of each genset 2120. The controller 2180 is also coupled to the back-to-back inverter 2140. The back-to-back inverter 2140 is not able to be controlled the same way as a battery or microgrid. During drilling there can be large rate changes on the gensets. If all e.g., three gensets 2120 are running, big rate changes usually aren't problematic. But keeping all three gensets 2120 running can be inefficient. Using just one genset 2120, at a higher load, is more efficient and less polluting. But one genset 2120 might be tripped offline by a big rate change. To allow the use of one genset 2120 instead of three, embodiments under the present disclosure make up for any difference in demand, such as in a rate change, with battery power from batteries 2195. Using the battery power means that the back-to-back inverter 2140 and the utility grid 2160 don't have to be solicited for the needed power change.

Figure 22:
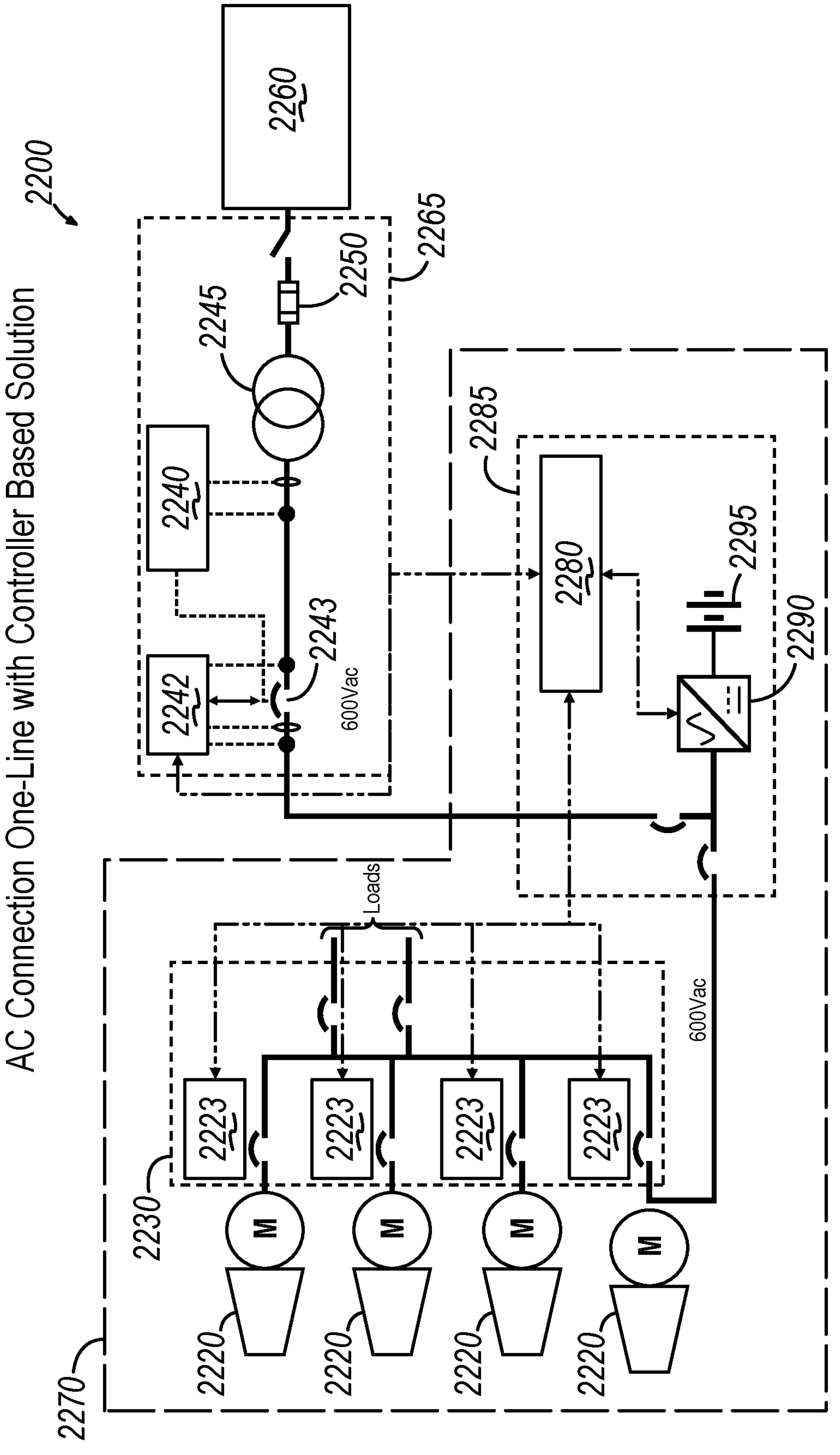
FIG. 22 shows a circuit diagram of an embodiment of a micro-grid system under the present disclosure.

FIG. 22 shows a system embodiment 2200 of an AC connection one-line with a controller-based solution. In this embodiment there is no reverse power flow to the utility grid 2260 because it is controlled by a reverse power flow and synchronization relay 2240. In case of a utility grid 2260 outage the grid connection 2243 goes to open and the microgrid 2270 reverts to island mode. Grid skid 2265 comprises grid connection 2250, isolation transformer 2245, reverse power flow and synchronization relay 2240, and grid controller 2242. Isolation transformer 2245 can comprise, e.g., a 600/600 with 480V tap. Grid skid 2265 can provide a connection to utility grid 2260 from the other components which can be grouped together as a microgrid 2270. Micro-grid 2270 includes the control skid 2285, the VFD house 2230, and gensets 2220. The control skid 2285 can provide dP/dt control of the rig load. Regardless of the rig load, the controllers 2223 can provide: a) actively controlled power draw from the utility grid with adjustable limits; b) actively controlled ramped power to eliminate line flicker; c) unity to 0.95 PF loading of the utility grid provided by the generators' grid tie operation. In FIG. 22, as compared to FIG. 21, there is no microgrid that is not synced to the utility grid 2260. Or one could say that the microgrid 2270 is fully frequency synced to the utility grid 2260. In this embodiment the engine controllers 2223 would preferably be solely controlling on power, not frequency; so-called "baseloading." The reverse power flow relay 2240 is also capable of syncing with the utility grid 2260 to bring the microgrid 2270 onto the utility grid 2260. This embodiment lacks the back-to-back inverter 2140 of FIG. 21, which has some implementation benefits. In the embodiment of FIG. 22 a constant power flow from the utility grid 2260 is desired. The problem is that the micro-grid loads 2270 may be bouncing erratically. The controller 2280 can supply battery power (or draw it to charge the batteries 2295) to even things out. Controller 2280 can control the battery inverter 2290, battery(ies) 2295, on control skid 2285. Grid controller 2242 can also control genset controllers 2223 controlling the engine of each genset 2220. Grid controller 2242 can be coupled to controller 2280 and controlled thereby. Grid controller 2242 can sync to the utility grid 2260 and, via grid controller 2242, control how much of the load is met by the gensets 2220. Genset controllers 2223 can be controlled by grid controller 2242 and can control the throttle position of each genset engine.

In FIG. 22 the control skid 2285 can manage power factor correction to ensure required operational parameters for using the utility grid 2260. In the previous embodiment of FIG. 21 the back-to-back inverter 2140 would do that. An AC connection with controller-based solution, as in FIG. 22, would have several differences. There would be a need to modify the VFD house 2230, e.g., back-to-back inverters could work with legacy analog engine controllers requiring little to no modifications. Less equipment would be required to make the grid connection 2250 to utility grid 2260.

Figure 23:
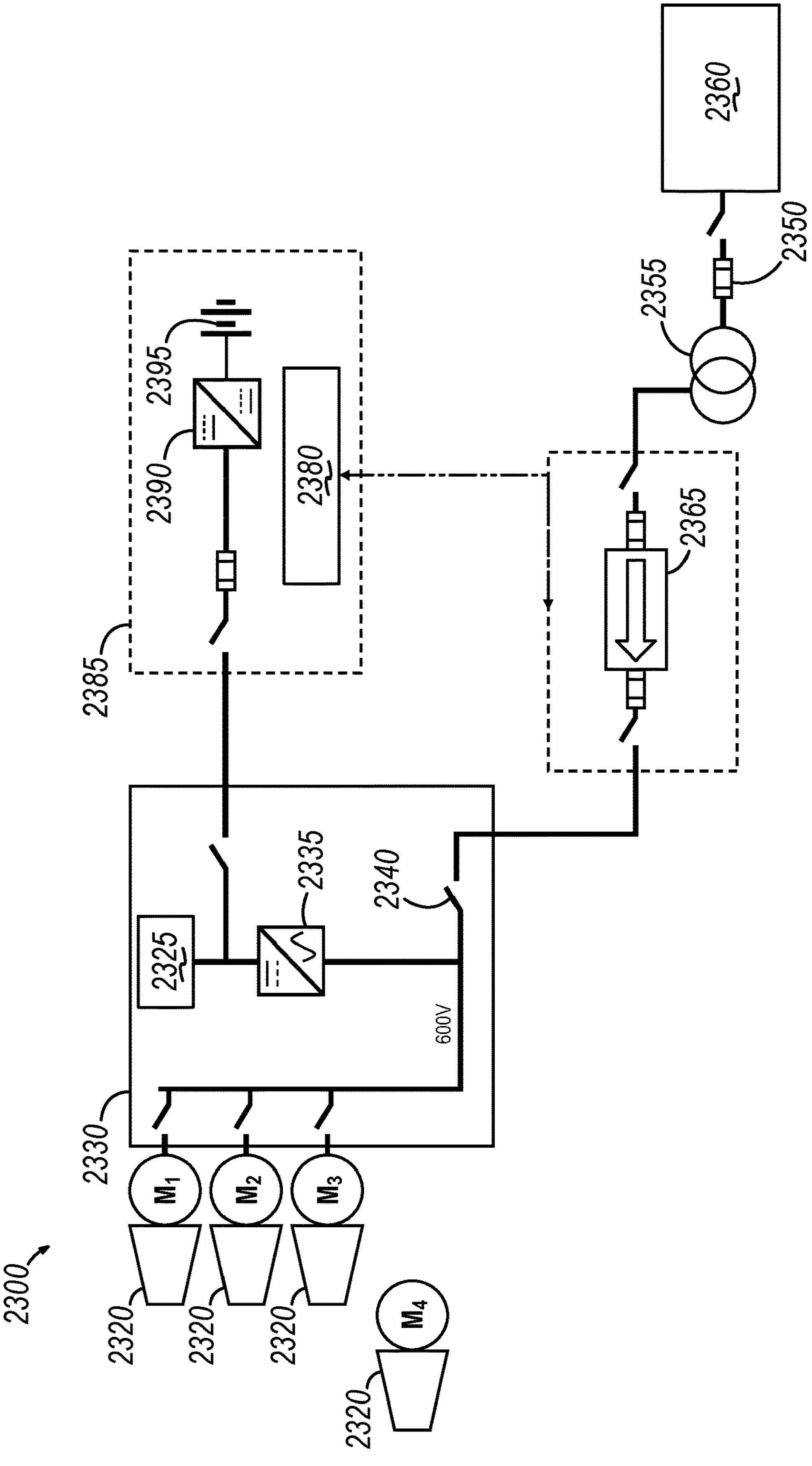
FIG. 23 shows a circuit diagram of an embodiment of a micro-grid system under the present disclosure.

FIG. 23 shows a plug and play highline support package embodiment 2300 where the utility grid 2360 is connected directly to the drilling rig's VFD house 2330. Grid connection 2350 can provide a connection to utility grid 2360. Step down isolation transformer 2355 and isolation circuitry 2365 can serve to isolate VFD house 2330 from the utility grid 2360 as needed. Control skid 2385 can comprise controller 2380, battery inverter 2390, and battery(ies) 2395. Controller 2380 can control the control skid 2385. Circuit breakers 2340 in VFD house 2330 can break the connection to the utility grid 2360 power if there's a power surge, flicker or power outage. Rectifier 2335 converts AC power from gensets 2320 to DC power for load 2325 and batteries 2395 via DC/DC converter 2390. Gensets 2320 can each comprise a generator Mn (e.g., M1 to M4). If any genset 2320 undergoes a power surge, or triggers off, controller 2380 can supply any power deficit with battery power from batteries 2395 (or collect excess energy and store it in batteries 2395). Circuit breakers 2340, connection circuitry 2365, and isolation transformer 2355 help isolate any power surges or draws from the utility grid 2360. During operation power from the utility grid 2360 can be used to charge batteries 2395 as well.

Figure 24:
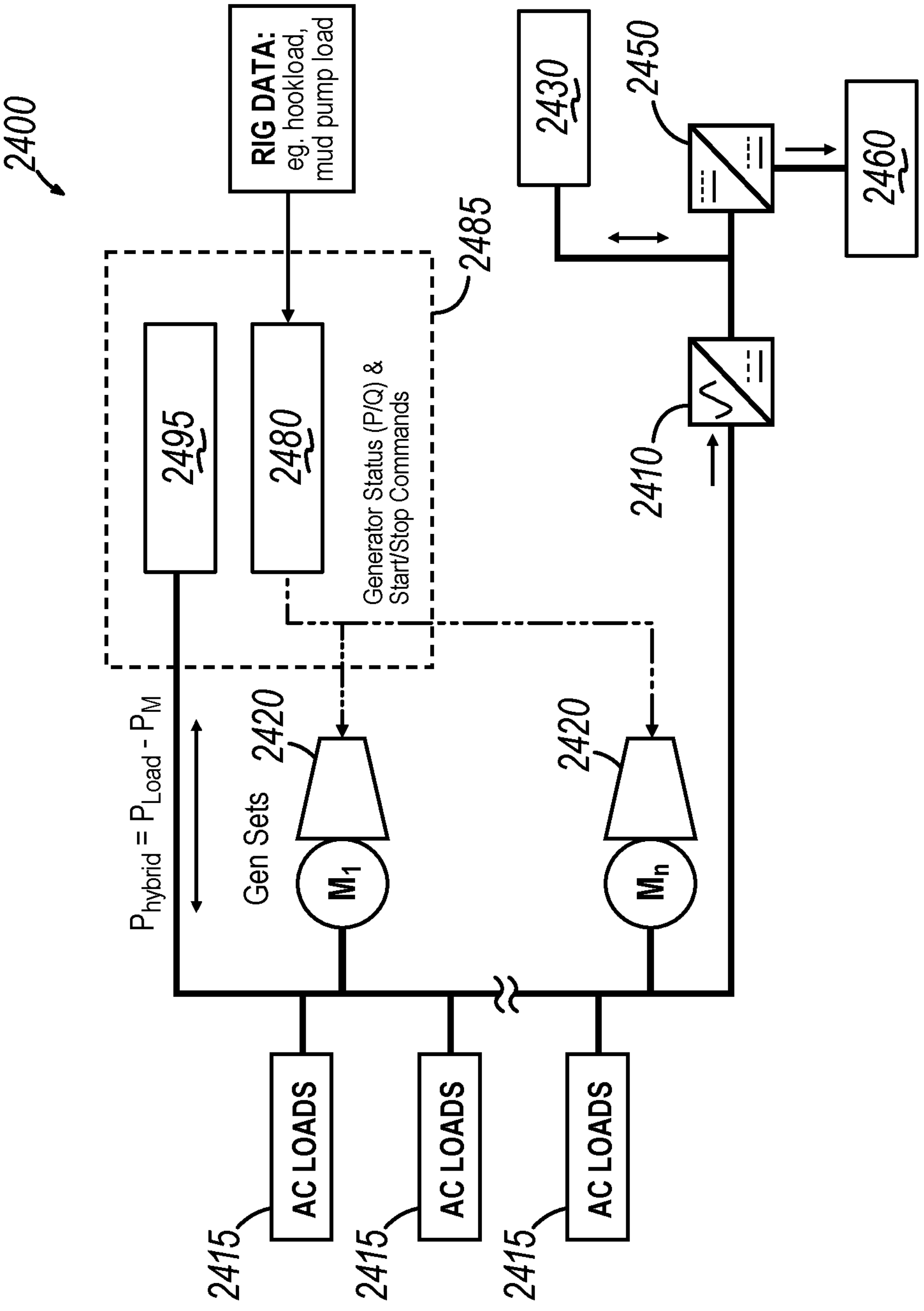
FIG. 24 shows a circuit diagram of an embodiment of a micro-grid system under the present disclosure.

FIG. 24 shows another possible AC connection one-line embodiment 2400 with no utility grid connection. Embodiment 2400 comprises a microgrid with multiple consumer tap points (no common bus load reading required). Control skid 2485 comprises a controller 2480 and battery/inverter 2490. Controller 2480 can communicate with gensets 2420 with generators Mn to determined generator status and perform start/stop commands. Controller 2480 can also track and monitor rig data such as hookload, mud pump load, and other factors and variables. The load experienced by the control skid ($P_{hybrid}$) will be equal to the $P_{load}$ minus the power drawn by the gensets $P_M$: $P_{hybrid}=P_{load}-P_M$. Rectifier 2410 (typically uni-directional) can provide a connection between AC loads 2415 and DC loads 2430. Converter 2450 provides a connection to resistor load bank 2460 for dissipating regenerative power.

Figure 25:
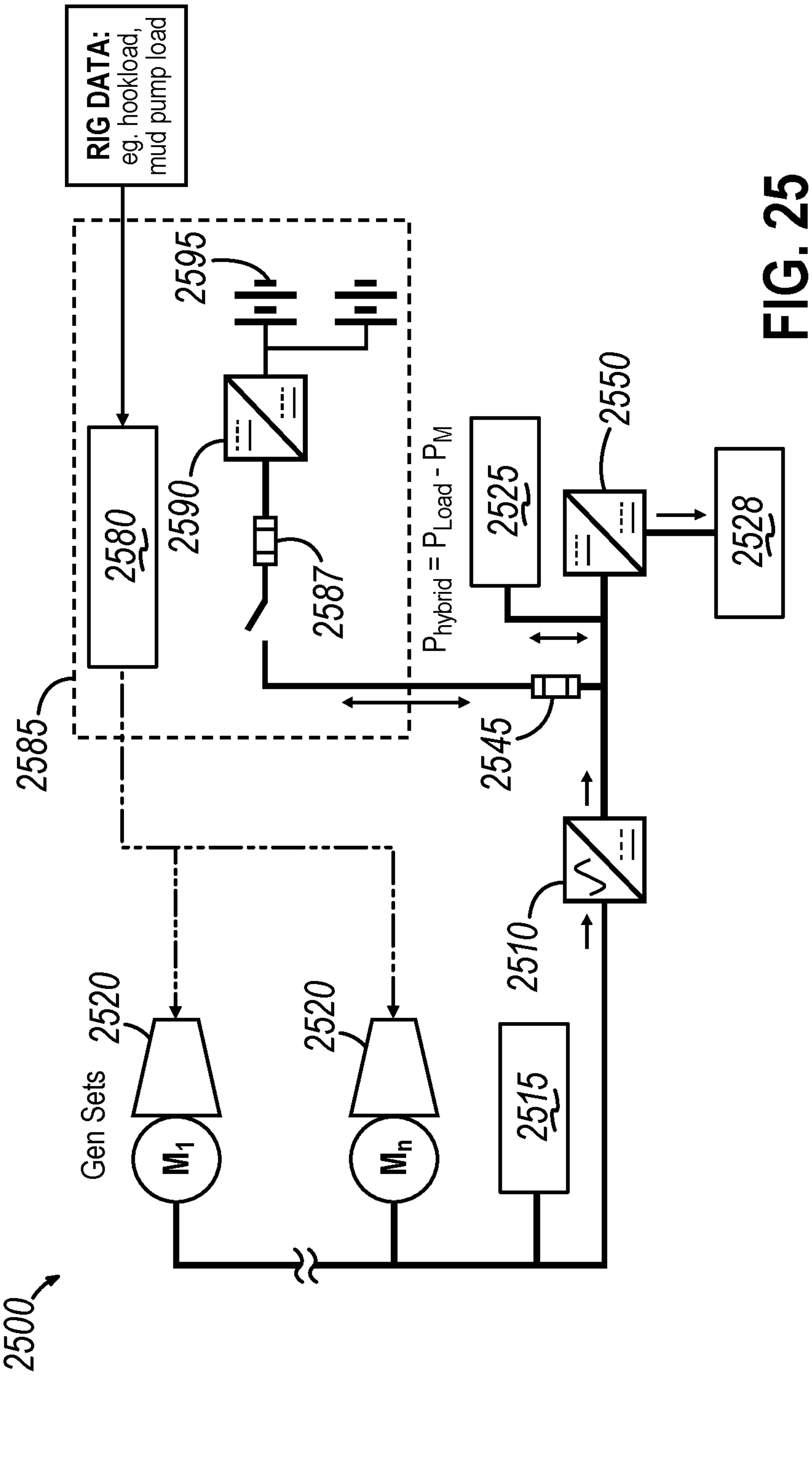
FIG. 25 shows a circuit diagram of an embodiment of a micro-grid system under the present disclosure.

FIG. 25 shows a possible DC connection one-line setup embodiment 2500 with no utility grid connection. Control skid 2585 comprises controller 2580, connection 2587, DC/DC converter 2590, and battery(ies) 2595. Controller 2580 can be coupled to and control a plurality of gensets 2520, each with an engine/generator Mn. Controller 2580 can communicate with gensets 2520 to determine generator status and perform start/stop commands. Controller 2580 can also track and monitor rig data such as hookload, mud pump load, and other factors and variables. AC loads 2515 can form a part of the drilling rig load. Rectifier 2510 (typically uni-directional) separates the AC loads 2515 from the DC loads of the control skid 2585, DC loads 2525, and resistor load bank 2528. Optional DC switch (or contactor with DC switch) 2545 can provide a connection between the DC loads 2525 and control skid 2585. Converter 2550 provides a connection to resistor load bank 2528 for collecting regenerative power. The load experienced by the control skid 2585 ($P_{hybrid}$) will be equal to the $P_{DCload}$ minus the power drawn by the gensets $P_M$: $P_{hybrid}=P_{DCload}-P_M$.

Figure 26:
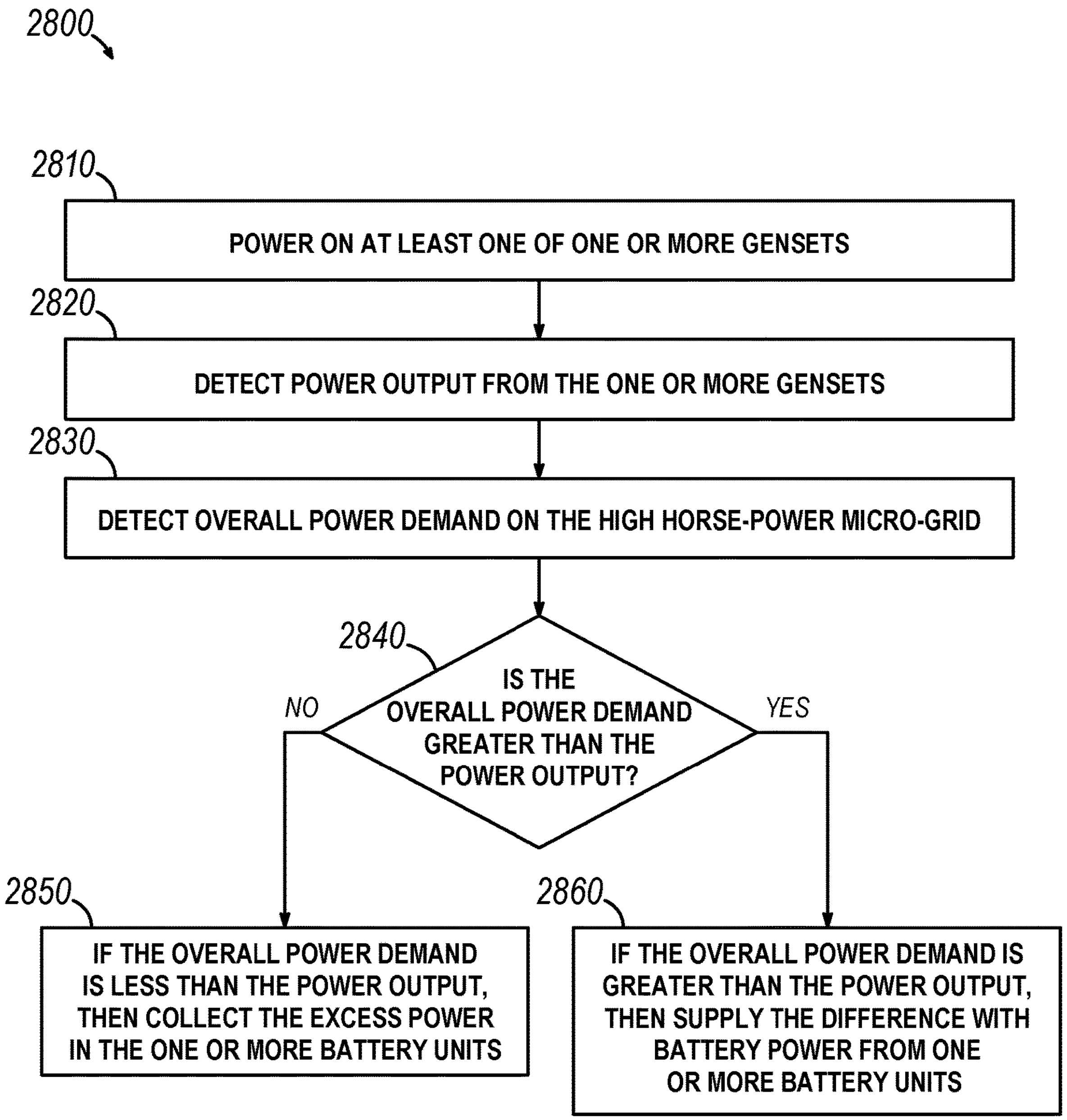
FIG. 26 shows a flow-chart of a method embodiment under the present disclosure.

One possible method embodiment under the present disclosure is shown in FIG. 26. Method 2800 comprises a method of controlling a high horse-power micro-grid. Step 2810 is to power on at least one of one or more gensets. Step 2820 is to detect power output from the one or more gensets. Step 2830 is to detect overall power demand on the high horse-power micro-grid. Step 2840 is to determine if the overall power demand is greater than the power output. At 2860, if the overall power demand is greater than the power output, then supply the difference with battery power from one or more battery units. Step 2850 is, if the overall power demand is less than the power output, then collect the excess power in the one or more battery units.

Figure 27:
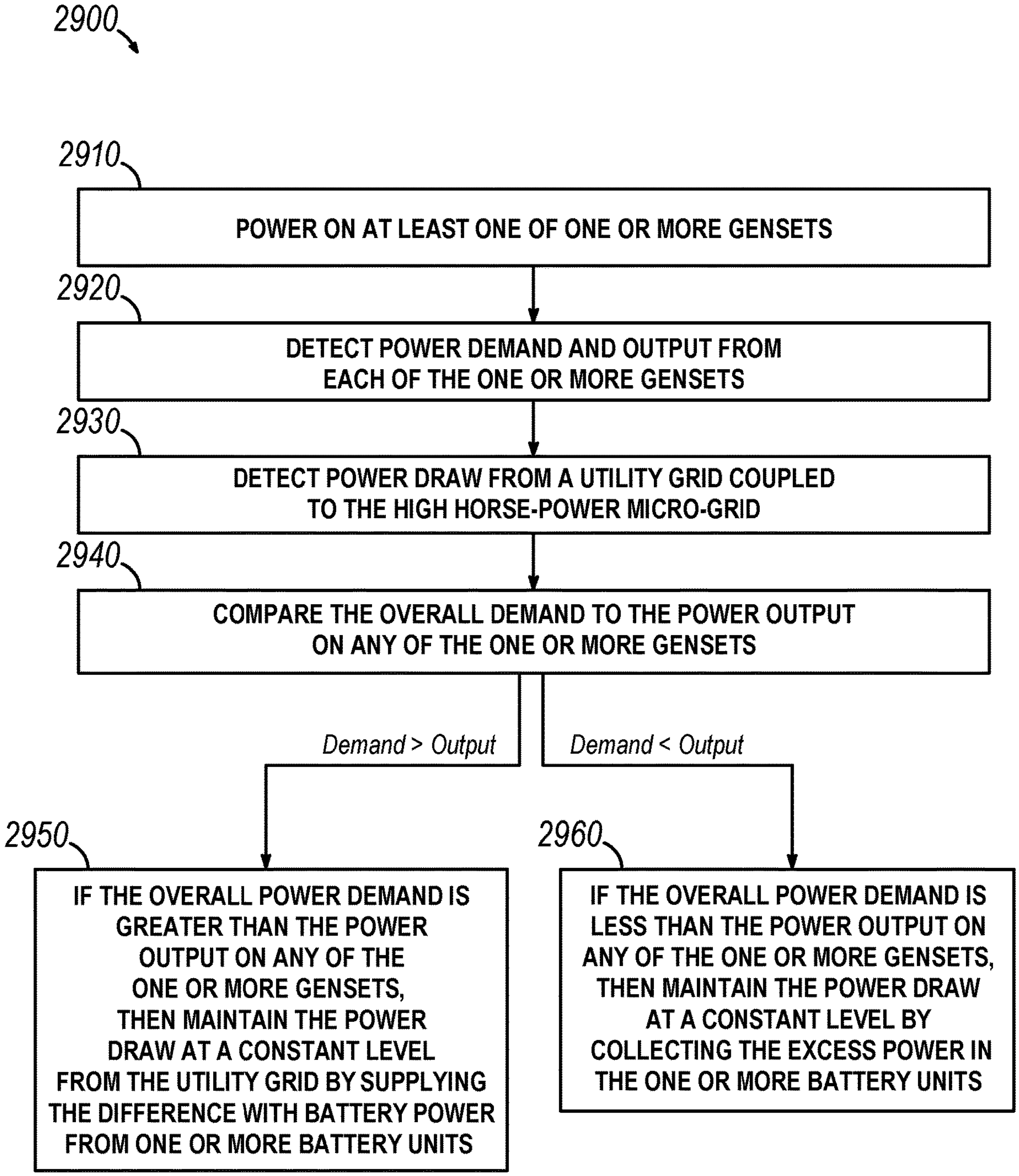
FIG. 27 shows a flow-chart of a method embodiment under the present disclosure.

Another possible method embodiment under the present disclosure is shown in FIG. 27. Method 2900 comprises a method of controlling a high horse-power micro-grid. Step 2910 is to power on at least one of one or more gensets. Step 2920 is to detect power demand and output from each of the one or more gensets. Step 2930 is to detect power draw from a utility grid coupled to the high horse-power micro-grid. Step 2940 is to compare the overall power demand to the power output on any one of the one or more gensets. Step 2950 is, if the overall power demand is greater than the power output on any of the one or more gensets, then maintaining the power draw at a constant level from the utility grid by supplying the difference with battery power from one or more battery units. Step 2960 is if the overall power demand is less than the power output on any of the one or more gensets, then maintaining the power draw at a constant level from the utility grid by collecting the excess power in the one or more battery units.

Figure 28:
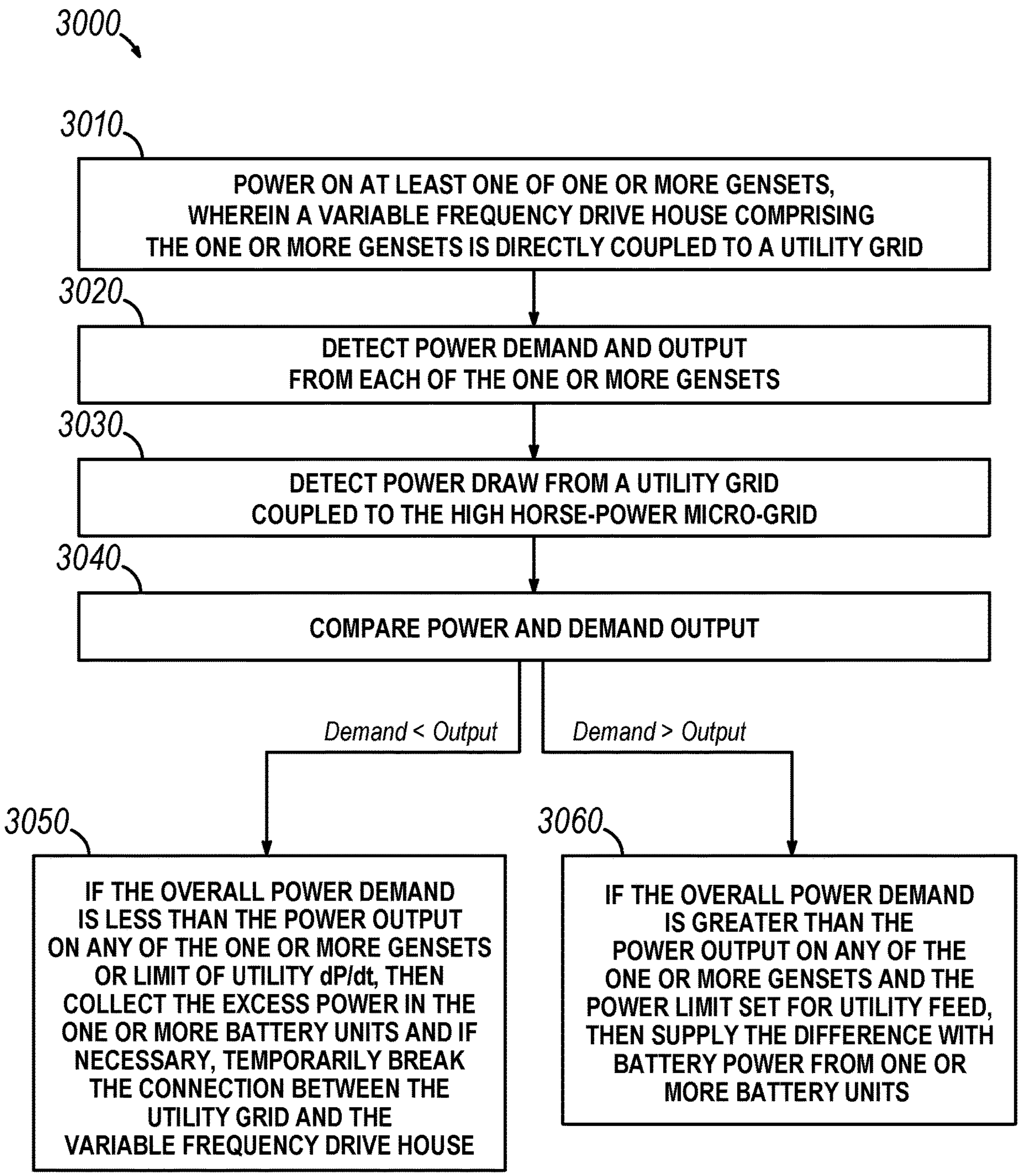
FIG. 28 shows a flow-chart of a method embodiment under the present disclosure.

A further possible method embodiment under the present disclosure is shown in FIG. 28. Method 3000 comprises a method of controlling a high horse-power micro-grid. Step 3010 is to power on at least one of one or more gensets, wherein a variable frequency drive house comprising the one or more gensets is directly coupled to a utility grid. Step 3020 is to detect power demand and output from each of the one or more gensets. Step 3030 is to detect power draw from a utility grid coupled to the high horse-power micro-grid. Step 3040 is comparing the power demand and output (and/or the limit of utility flicker or dP/dt, or the power limit set for the utility feed). At 3060, if the overall power demand is greater than the power output on any of the one or more gensets and the power limit set for utility feed, then supply the difference with battery power from one or more battery units. Step 3050 is, if the overall power demand is less than the power output on any of the one or more gensets (or limit of utility dP/dt), then collect the excess power in the one or more battery units and if necessary temporarily reduce power from the utility grid.

Figure 29:
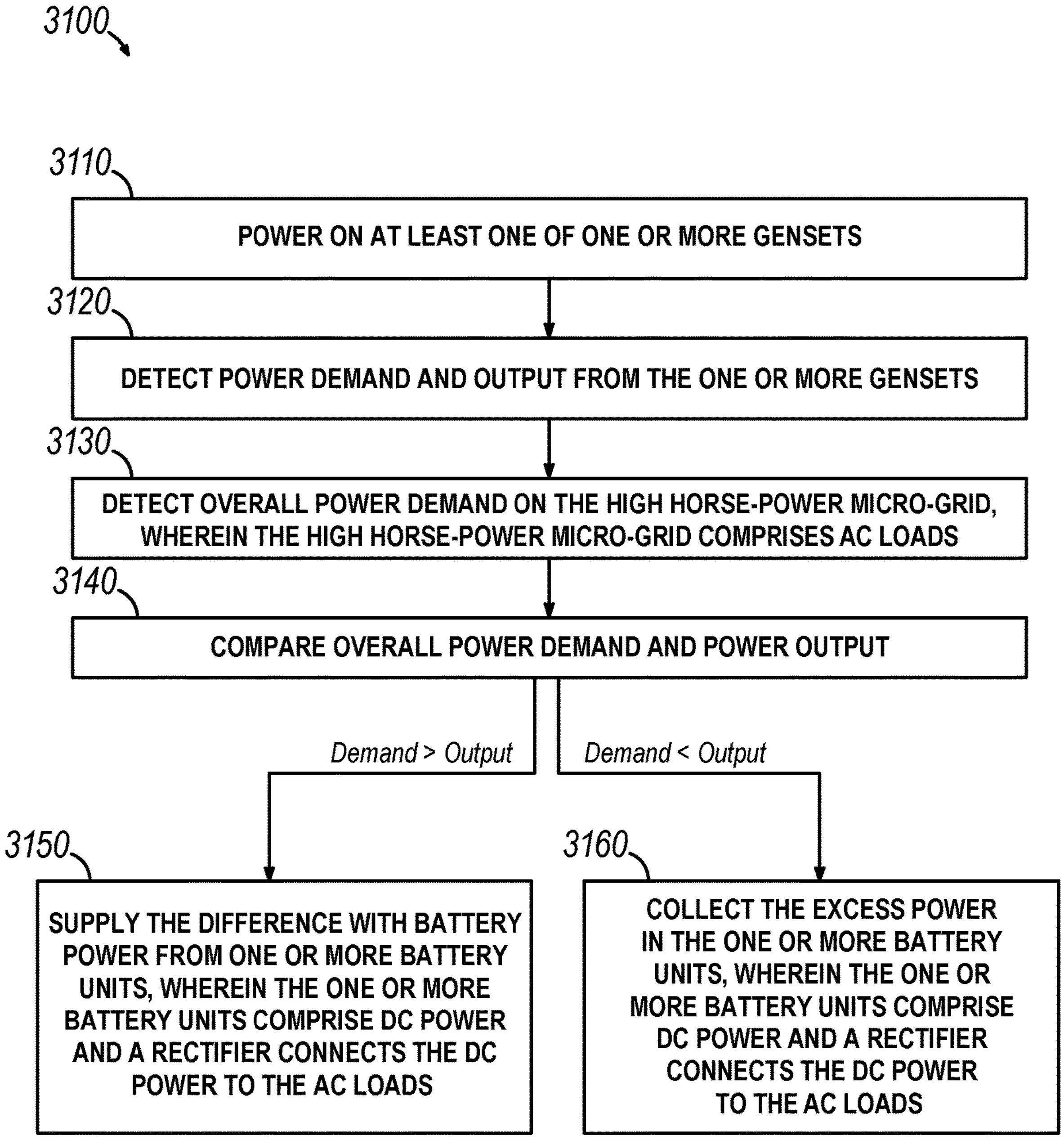
FIG. 29 shows a flow-chart of a method embodiment under the present disclosure.

A further possible method embodiment under the present disclosure is shown in FIG. 29. Method 3100 comprises a method of controlling a high horse-power micro-grid. In this method, the controller can be located on the AC portion of the system. Step 3110 is to power on at least one of one or more gensets. Step 3120 is to detect power demand and output from the one or more gensets. Step 3130 is to detect overall power demand on the high horse-power micro-grid, wherein the high horse-power micro-grid comprises AC loads. Step 3140 is comparing overall power demand and power output. At 3150, if the overall power demand is greater than the power output, then supply the difference with battery power from one or more battery units. At 3160, if the overall power demand is less than the power output, then collect the excess power in the one or more battery units. This method is characterized in that the one or more battery units comprise DC power and a rectifier connects the DC power to the AC loads.

Figure 30:
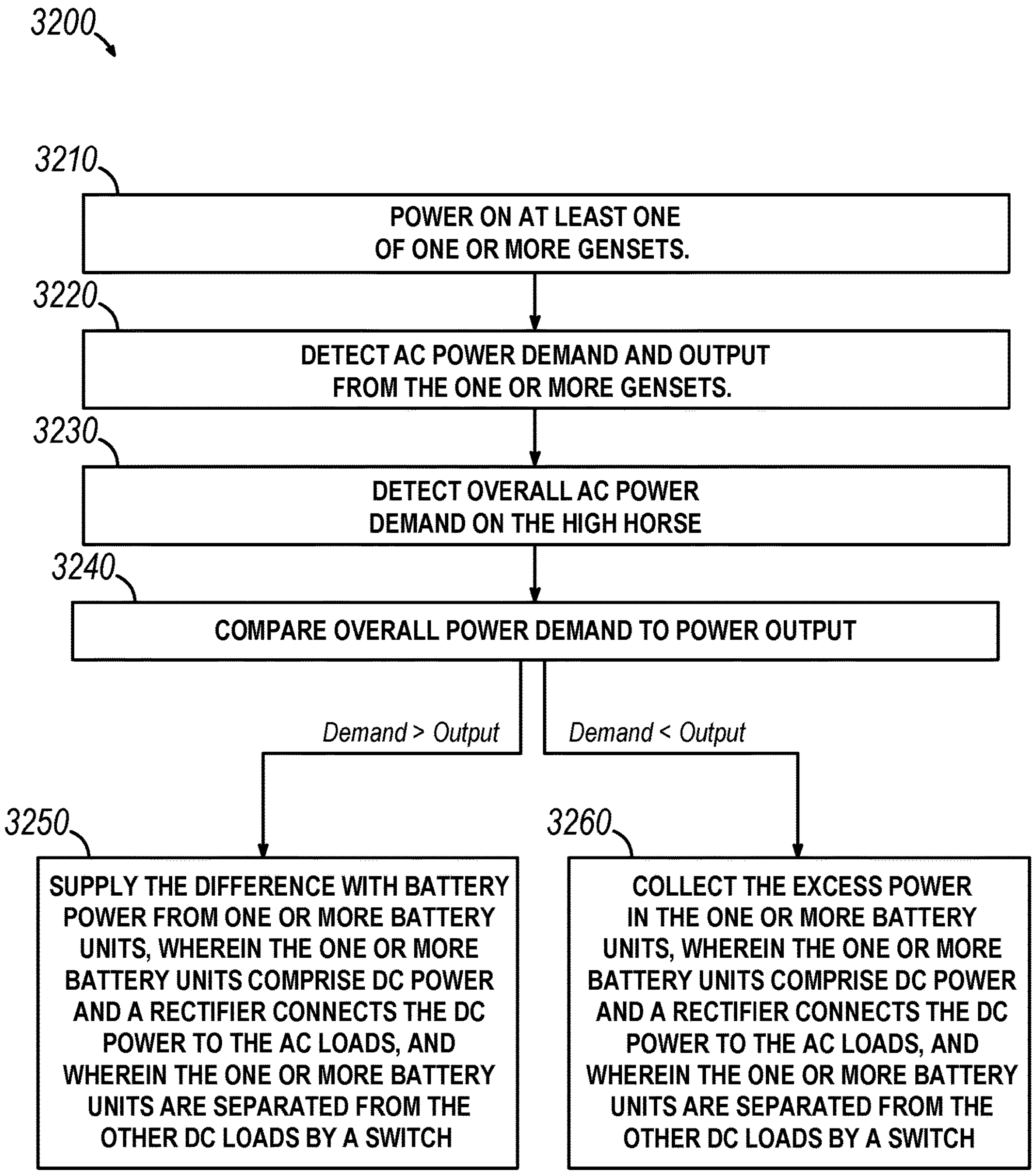
FIG. 30 shows a flow-chart of a method embodiment under the present disclosure.

A further possible method embodiment under the present disclosure is shown in FIG. 30. Method 3200 comprises a method of controlling a high horse-power micro-grid with a controller on a DC side of the system. Step 3210 is to power on at least one of one or more gensets. Step 3220 is to detect AC power demand and output from the one or more gensets. Step 3230 is to detect overall AC power demand on the high horse-power micro-grid. Step 3240 is to compare overall power demand to power output. At 3250, if the overall power demand is greater than the power output, then supply the difference with battery power from one or more battery units. At 3260, if the overall power demand is less than the power output, then collect the excess power in the one or more battery units. This method can be characterized in that the one or more battery units comprise DC power and a rectifier connects the DC power to the AC loads, and wherein the one or more battery units are separated from other DC loads by a switch.

In any method embodiment under the present disclosure less than all of the available gensets may be powered on at a given time. Preferably, apart from startup periods or powering down periods, any genset in operation is run at a high load, generally 70% and higher or as high as possible for a given loading condition.

Computer Systems of the Present Disclosure

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily-utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for a high horse-power micro-grid, comprising:
- one or more connections to one or more generator sets (gensets) configured to:
  - detect power produced by each of the one or more gensets; and
  - adjust a throttle position of each of the one or more gensets; and
- a power connection to one or more battery units;
- a utility grid interconnection comprising a grid switch and a back-to-back inverter configured to couple the high-horsepower micro-grid to a utility grid;
- wherein the controller is configured to:
  - detect changes in power demand on the high horse-power micro-grid;
  - compare overall power demand to aggregate genset output; and
  - in response to a detected change in power demand, dispatch the one or more battery units to supply a difference in power output to overcome a power deficit and/or import excess power into the one or more battery units to relieve a power overage; and
  - regulate interaction with the utility grid by maintaining a substantially constant power draw from the utility grid and limiting power variation over time to mitigate line flicker.

2. The controller of claim 1 wherein the one or more connections and the power connection comprise high bandwidth connections.

3. The controller of claim 1, further comprising an inverter connection coupled to the back-to-back inverter coupled to a power grid.

4. The controller of claim 3 wherein the power grid comprises AC power.

5. The controller of claim 3 wherein the back-to-back inverter is configured to prevent reverse power flow onto the power grid.

6. The controller of claim 3, wherein the back-to-back inverter is coupled to an isolation transformer.

7. The controller of claim 1 wherein the controller is configured to detect aggregate demand on the one or more gensets and to detect the output of each of the one or more gensets.

8. The controller of claim 1 wherein during normal operation at least one of the one or more gensets is powered off at any moment.

9. A method performed by a hybrid energy controller for controlling a high horse-power micro-grid coupled to a utility grid via a grid switch and a back-to-back inverter, comprising:
- powering on at least one of one or more generator sets (gensets);
- detecting power output from the one or more gensets;
- adjusting throttle positions of the one or more gensets;
- detecting overall power demand on the high horse-power micro-grid;
- comparing overall power demand to power output; and
  - if the overall power demand is greater than the power output, then supplying the difference with battery power from one or more battery units; and
  - if the overall power demand is less than the power output, then storing the excess power in the one or more battery units;
- dynamically controlling battery dispatch and genset throttle coordination to maintain a substantially constant utility-grid power draw and to limit change of power variation over time to reduce line flicker and power surges.

10. The method of claim 9 wherein if there is a power surge from the one or more gensets, then preventing reverse power flow onto the utility grid with the back-to-back inverter.

11. The method of claim 9 further comprising running each of the powered on one or more gensets at a power level of at least 70% after a startup period and before a power down.

* * * * *